US 9,040,849 B2

(12) United States Patent
Tada

(10) Patent No.: US 9,040,849 B2
(45) Date of Patent: May 26, 2015

(54) ROTATING SWITCH MECHANISM WITH LOCKING MECHANISM

(71) Applicant: Takashi Tada, Kumagaya (JP)

(72) Inventor: Takashi Tada, Kumagaya (JP)

(73) Assignee: RICOH COMPANY, LTD., Tokyo (JP)

( * ) Notice: Subject to any disclaimer, the term of this patent is extended or adjusted under 35 U.S.C. 154(b) by 121 days.

(21) Appl. No.: 13/973,389

(22) Filed: Aug. 22, 2013

(65) Prior Publication Data

US 2014/0061009 A1    Mar. 6, 2014

(30) Foreign Application Priority Data

Sep. 4, 2012   (JP) ................................. 2012-194016

(51) Int. Cl.
| | |
|---|---|
| *H01H 9/00* | (2006.01) |
| *H01H 3/20* | (2006.01) |
| *G03B 17/02* | (2006.01) |
| *H01H 19/58* | (2006.01) |

(52) U.S. Cl.
CPC ................. *H01H 3/20* (2013.01); *G03B 17/02* (2013.01); *H01H 19/585* (2013.01)

(58) Field of Classification Search
CPC ... H01H 25/00; H01H 25/006; H01H 25/008; H01H 25/065; H01H 2025/004; H01H 2025/043; H01H 2025/045; H01H 15/102; H01H 19/14
USPC ...................................... 200/4, 178, 5 R, 548
See application file for complete search history.

(56) References Cited

U.S. PATENT DOCUMENTS

| 4,038,672 A | * | 7/1977 | Kondo et al. ................. 396/394 |
|---|---|---|---|
| 4,125,850 A | * | 11/1978 | Fujita et al. ................... 396/302 |
| 6,229,104 B1 | * | 5/2001 | Matsui .............................. 200/4 |
| 7,029,420 B2 | * | 4/2006 | Sekino et al. .................... 477/99 |
| 2005/0201746 A1 | | 9/2005 | Kurosawa |
| 2011/0102668 A1 | | 5/2011 | Kaga et al. |
| 2011/0109790 A1 | | 5/2011 | Shinohara et al. |
| 2011/0177386 A1 | | 7/2011 | Tada |
| 2011/0216237 A1 | | 9/2011 | Shinohara et al. |
| 2011/0298970 A1 | | 12/2011 | Shinohara et al. |
| 2012/0154665 A1 | | 6/2012 | Kaga et al. |

FOREIGN PATENT DOCUMENTS

| JP | 2007-171669 | 7/2007 |
|---|---|---|
| JP | 2008-170494 | 7/2008 |
| JP | 4530689 | 6/2010 |

* cited by examiner

*Primary Examiner* — Vanessa Girardi
(74) *Attorney, Agent, or Firm* — Oblon, McClelland, Maier & Neustadt, L.L.P.

(57) ABSTRACT

An electronic device, comprising a rotating switch mechanism for switching a conduction state of a predefined electronic circuit corresponding to a rotating operation of a rotating operation part rotatably provided on a housing on the predefined rotational axis, a locking mechanism for locking the rotation of the rotating operation part relative to the housing, and a switching member for switching an operating state and a non-operating state of the electronic device, wherein the locking mechanism locks the rotation of the rotating operation part relative to the housing when the electronic device is in the operating state and does not lock the rotation of the rotating operation part relative to the housing when the electronic device is in the non-operating state so that the rotation of the rotating operation part of the rotating switch mechanism provided to the electronic device can be locked with improved usability.

10 Claims, 13 Drawing Sheets

ROTATING SWITCH MECHANISM WITH LOCKING MECHANISM

CROSS-REFERENCE TO RELATED APPLICATIONS

The present application is based on and claims priority from Japanese Patent Application Number 2012-194016, filed on Sep. 4, 2012, the disclosure of which is hereby incorporated by reference herein in its entirety.

BACKGROUND OF THE INVENTION

1. Field of the Invention

The present invention relates to an electronic device including a rotating switch mechanism capable of switching by a rotating operation.

2. Description of the Related Art

Electronic devices such as digital cameras are generally equipped with a rotating switch mechanism capable of switching a plurality of preset shooting modes by rotating a rotating operation part rotatably provided with a housing. In these electronic devices, only one rotating operation part of the rotating switch mechanism has a function of switching a plurality of preset shooting modes. Therefore, these electronic devices can be further downsized and improved in terms of usability.

However, the rotating operation part of the rotating switch mechanism is often rotated accidentally when the electronic device is carried in a bag, a pocket, or the like in a non-operating state (power-off).

If a rotating switch mechanism is provided in order to switch a plurality of shooting modes, this may trigger a shooting in an unintended shooting mode.

Therefore, in order to provide a locking mechanism, configured to lock a rotation of a rotating operation part by inserting a part of an indicator slidably provided on a housing into a locking groove provided on a rotating operation part by the pressure of an elastic member when the electronic device is in the non-operating state (power-off), a rotating switch mechanism has been proposed, for example, in Japanese Patent Application Publication No. 2008-170494 (Patent Document 1). In such a conventional electronic device, the rotation of the rotating operation part can be locked by simply pressing the switching member into the non-operating state (power-off). Thus, unintentional rotation of the rotating operation part can be prevented, and usability of the electronic device can be improved.

SUMMARY OF THE INVENTION

However, such an electronic device requires further improvement in terms of usability because the rotating operation of the rotating operation part of the rotating switch mechanism cannot be operated and the electronic device cannot be put into an operating state (power-on) without a releasing operation by sliding the indicator to release the indicator inserted in the locking groove.

The present invention has been developed in order to solve the above problems, and an object thereof is to provide an electronic device that can rotate the rotating operation part of the rotating switch mechanism, and thus improve usability.

The electronic device according to an aspect of the invention includes a rotating switch mechanism for switching a conduction state of a predefined electronic circuit corresponding to a rotating operation of a rotating operation part rotatably provided on a housing on the predefined rotational axis, and a lock mechanism for locking the rotation of the rotating operation part relative to the housing, the switching member for switching an operating state and a non-operating state of the electronic device; wherein the locking mechanism locks the rotation of the rotating operation part relative to the housing when the electronic device is in the non-operating state and does not lock the rotation of the rotating operation part relative to the housing when the electronic device is in the operating state, the switching member is movable between the operating position for putting the electronic device into the operating state and the non-operating position for putting the electronic device into the non-operating state, and the switching member releases the lock of the rotation of the rotating operation part relative to the housing by interference with the locking mechanism when the switching member is in the operating position, and the switching member locks the rotation of the rotating operation part relative to the housing by being released from interference with the locking mechanism when the switching member is in the non-operating position.

The electronic device according to the aspect of the invention can lock the rotation of the rotating operation part of the rotating switch mechanism, thus making it more user-friendly.

DETAILED DESCRIPTION OF THE PREFERRED EMBODIMENT

Hereinafter, an embodiment of the present invention relating to an electronic device and a rotating switch mechanism attached thereto will be described with reference to the drawings.

The configuration of an imaging device 10 as an embodiment of the electronic device according to the present invention and a rotating switch mechanism 30 as an embodiment of the rotating switch mechanism provided to the imaging device 10 will be described with reference to FIG. 1A to FIG. 16. Hereinafter, based on the imaging device 10, it is assumed that the direction along the optical axis (see arrow in FIG. 1A) of an imaging optical system 12 described below is a front-back direction (refer to arrow FB, object side is front (F) side), a vertical direction when viewed from the front of the imaging device 10 is an up-down direction (refer to arrow UD), and the left side when viewed from the object side (left side in FIG. 1A) is a right side of the imaging device 10 (refer to arrow LR).

Figure 1A:
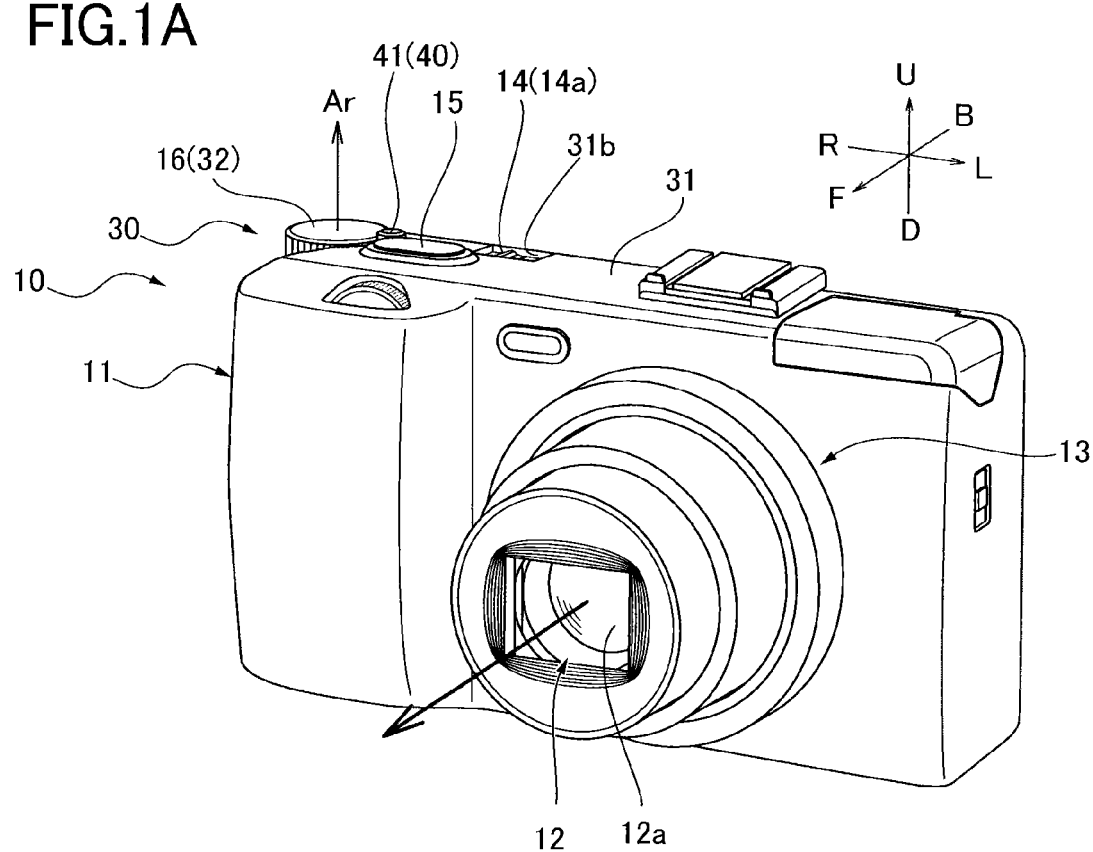
FIG. 1A is a front perspective view of an imaging device 10 as an embodiment of an electronic device related to the present invention.

At first, a summary of the imaging device 10 as an example of the electronic device on which the rotating switch mechanism 30 is provided will be described with reference to FIG. 1A, FIG. 1B and FIG. 2. As shown in FIG. 1A, the imaging device 10 has a lens barrel 13 containing the imaging optical system 12 attached on the front side of a housing 11 (front side of FIG. 1A). The imaging optical system 12 has a plurality of optical elements such as an objective lens 12a placed at the side closest to an object, a fixed lens, a zoom lens, a shutter unit, and a diaphragm unit (not shown). Each of the optical elements as the imaging optical system 12 including the objective lens 12a is movably held by the lens barrel 13 in the direction of the optical axis of the imaging optical system 12 (see arrow in FIG. 1A). The lens barrel 13 performs extension and contraction between a predefined storage position (not shown) and predefined extended position (standby state to shooting (see FIG. 1A)) along the optical axis of the imaging optical system 12. The lens barrel 13 makes each of the optical elements (not shown) of the imaging optical system 12 (see FIG. 1A) move as prescribed by transferring between the predefined storage position and predefined extended position.

As operating parts, an on/off lever 14, a shutter button 15, and a mode-switching dial 16 are provided on a top surface of the housing 11 (upside in FIG. 1A,B). The on/off lever 14 is configured to slide in a left-right direction relative to the housing 11 in order to put the imaging device 10 into an operating state (start-up operation) or into a non-operating state (shut-down operation). The shutter button 15 is configured to press downward in a vertical direction in order to run an operation to shoot an object. The mode-switching dial 16 is configured to rotate (hereinafter also referred to as a rotating operation) on its rotational axis Ar described below in order to set various shooting modes (various still image shooting modes, video shooting modes, and scene modes). In this embodiment, the mode-switching dial 16 is configured in association with the on/off lever 14 through the rotating switch mechanism 30 according to the present invention, and this will be described in detail later.

Figure 1B:
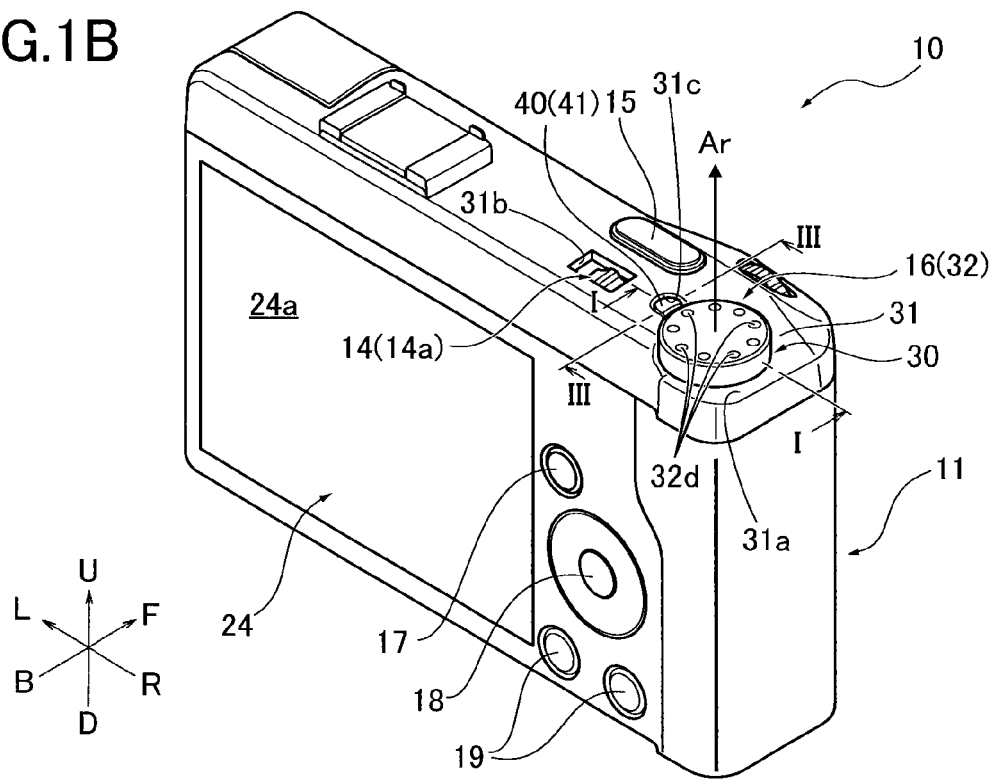
FIG. 1B is a rear perspective view of the imaging device 10 as an embodiment of an electronic device related to the present invention.

Moreover, a play button 17, a direction indicator switch 18, operating switches 19, and a display 24 (a screen 24a) are provided on a back surface of the housing 11 (nearside in FIG. 1B). The play button 17 is configured to operate in order to play (display) obtained images on the display 24 (the screen 24a). The direction indicator switch 18 is configured to select the direction on an operation screen displayed on the display 24 (the screen 24a). The operating switches 19 set various menus. Furthermore, the display 24 is formed of, for example, a liquid crystal display, and displays the images on the screen 24a based on the image data imaged or stored in a recording media.

Figure 2:
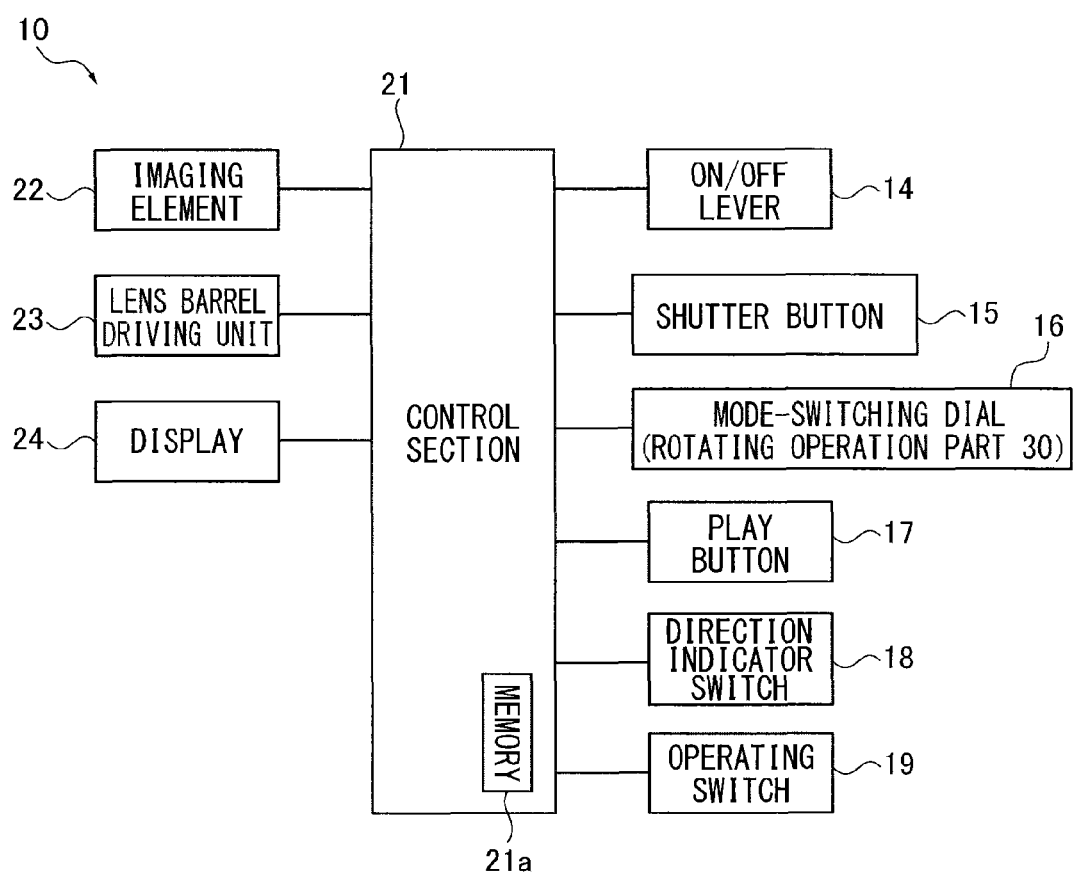
FIG. 2 is a control block diagram of the imaging device 10.
Figure 3:
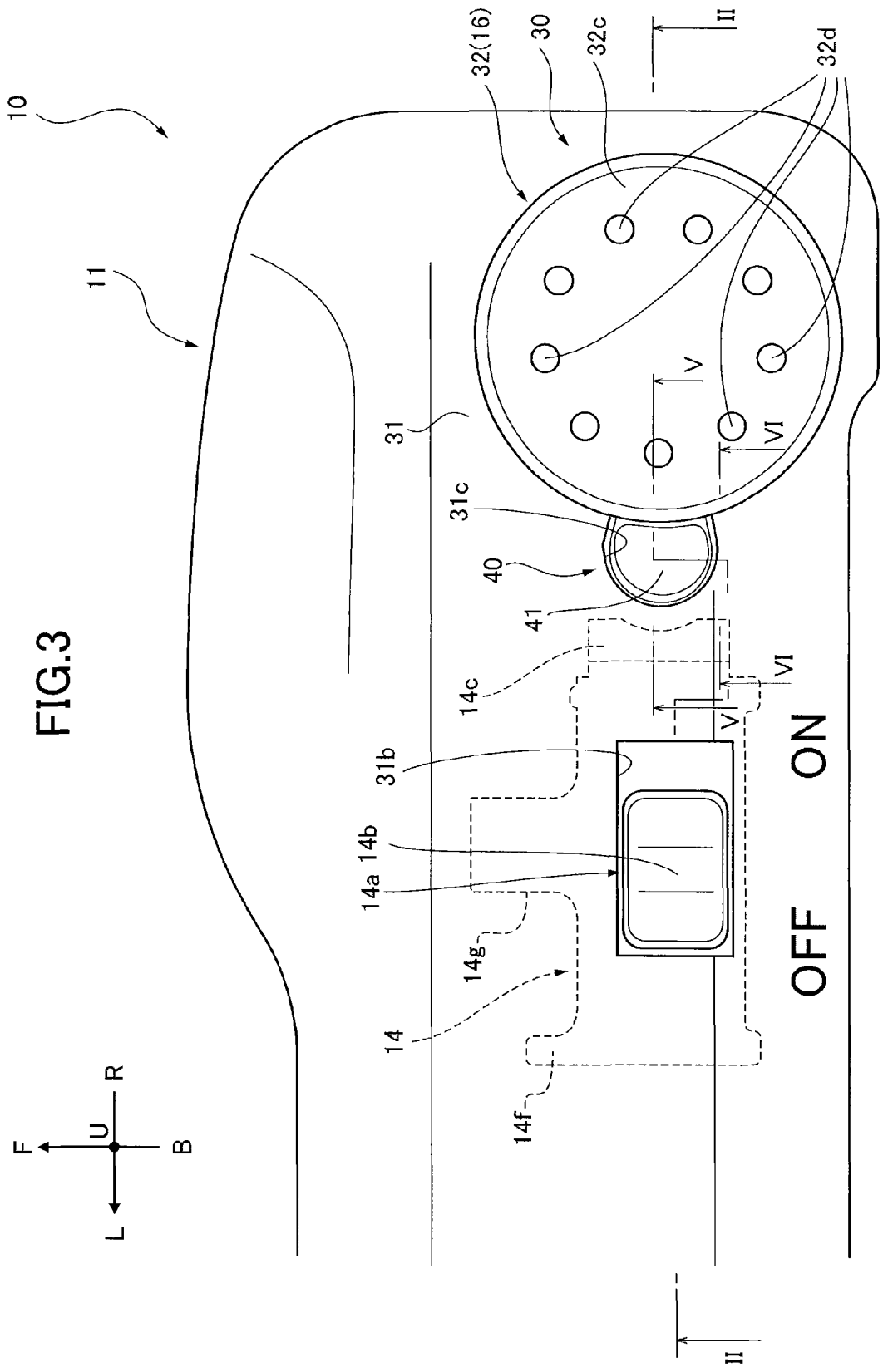
FIG. 3 is an enlarged plan view around a mode-switching dial 16 i.e., a rotating switch mechanism 30 when an on/off lever 14 is in a non-operating state.

As shown in FIG. 2, the imaging device 10 has a control section 21, an imaging element 22, a lens barrel-driving unit 23, and the display 24 described above. The control section 21 manages a driving process based on the operations of the on/off lever 14, the shutter button 15, the mode-switching dial 16, the play button 17, the direction indicator switch 18, and the operating switches 19, the image data production based on a signal from the imaging element 22, and drive controlling of the lens barrel-driving unit 23 and the display 24, by a program stored in a memory 21a. The control section 21 obtains the images by the imaging element 22 through the imaging optical system 12 (see FIG. 1A) and displays the images on the display 24 provided on the back side of the housing 11. The imaging element 22, the lens barrel-driving unit 23, and the display 24 are supplied with power from a battery (not shown) through the control section 21.

The imaging element 22 is formed of a solid-state image-sensing device such as a CCD (charge-coupled device) image sensor or a CMOS image sensor. The imaging element 22 outputs the object image imaged on the receiving surface (not shown) after converting into an electric signal (image data) through the imaging optical system 12 (see FIG. 1A). The outputted electric signals (image data) are transmitted to the control section 21.

The lens barrel-driving unit 23 transfers the retaining frames of the optical element (not shown) holding each of the optical elements of the imaging optical system 12 by transferring the lens barrel 13 between the storage position (not shown) and the extended position (see FIG. 1B).

The imaging device 10 records the image data of the object images received by the receiving surface of the imaging element 22 through the imaging optical system 12 when the control section 21 detects that the shutter button 15 is pushed down. Furthermore, the imaging device 10 can display the images based on recorded image data on the display 24 under the control of the control section 21. The control section 21 switches the various shooting modes (various still image shooting modes, video shooting modes, and scene modes) corresponding to the signals outputted from the rotating switch mechanism 30 depending on a rotational position of the mode-switching dial 16 (a rotating operation part 32 described below).

Figure 4:
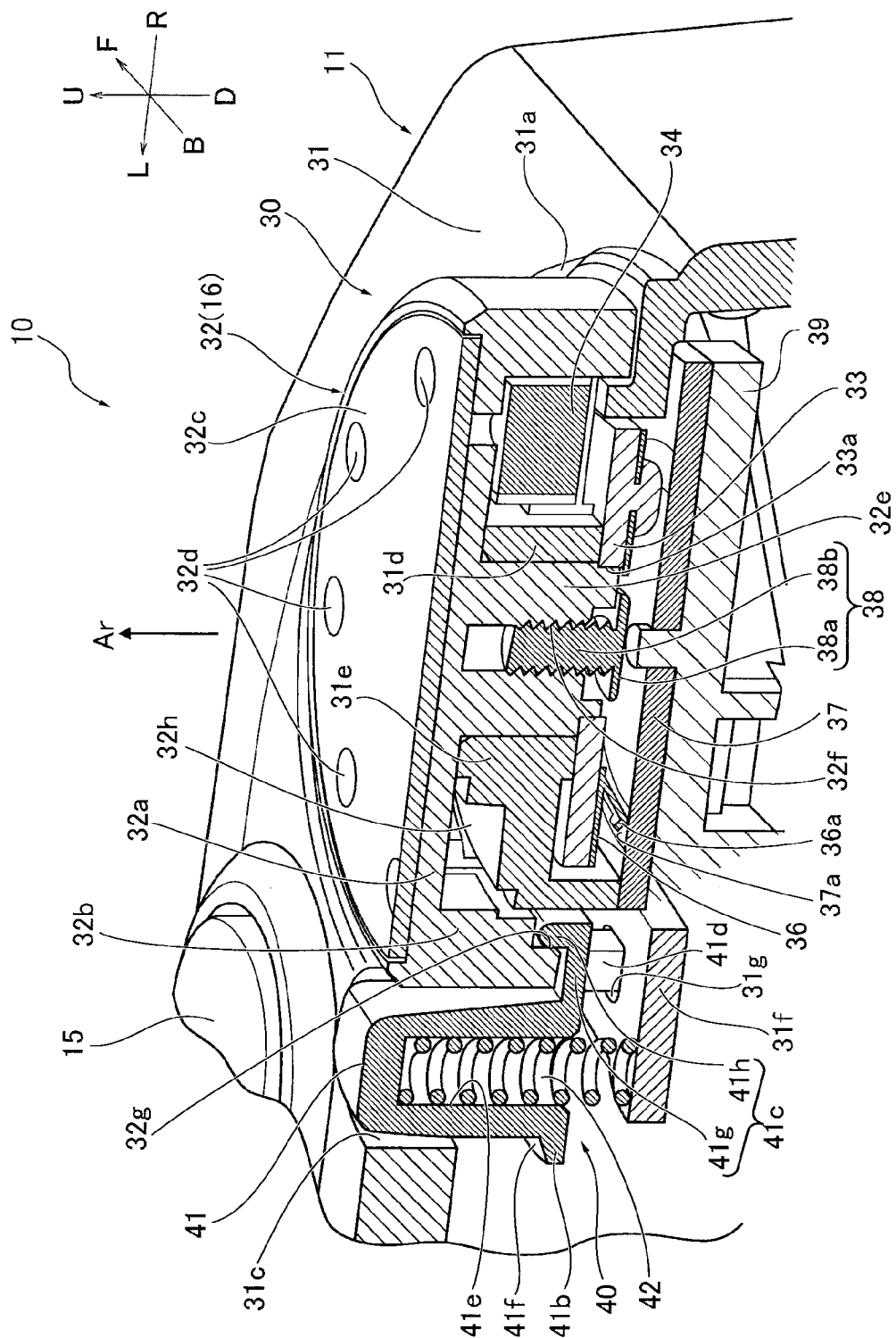
FIG. 4 is a cross-sectional view around the rotating switch mechanism 30 along the line I-I in FIG. 1B.

Next, a feature of a schematic configuration of the rotating switch mechanism 30 as an embodiment of the rotating switch mechanism according to the present invention used in the imaging device 10 will be described with reference to FIG. 1A to FIG. 16. In this embodiment, the rotating switch mechanism 30 is provided to the housing 11 (an exterior covering 31 described below) so as to enable the rotating operation of the mode-switching dial 16 and outputting of the signal depending on the rotational position (see FIG. 3). As shown in FIG. 4, the rotating switch mechanism 30 is formed of a rotating operation part 32, a mounting plate 33, a clicker 34, a coil spring 35 (see FIG. 6), a conductive member 36, and a circuit substrate 37 provided on the exterior covering 31 forming a part of the housing 11.

The exterior covering 31 is provided to form the top portion of the housing 11 and assumed to be a flat horizontal plane. On the upper right of the exterior covering 31, i.e. the housing 11, a rotational recess 31a to install the rotating operation part 32, an on/off lever aperture 31b to operate the on/off lever 14, and a locking operation recess 31c to install a locking member 41 described below are provided (see FIG. 3 and FIG. 4). A mounting boss section 31d rotatably receiving a boss section 32e described below of the rotating operation part 32 and a spring-loaded wall 31e which can be provided in a containing space 32h described below of the rotating operation part 32 are provided in the rotational recess 31a. Moreover, the locking operation recess 31c has a spring retainer plate 31f installed on the lower side of the locking operation recess 31c and a pair of guide holes 31g vertically penetrating through the spring retainer plate 31f.

The rotating operation part 32 installed in the rotational recess 31a forms a part rotated for operation relative to the exterior covering 31 i.e., the housing 11 (surface thereof) which is, and in this embodiment, forms the mode-switching dial 16 (see FIG. 1A,B). The rotating operation part 32 is formed of a disc-shaped part 32a and an outer peripheral wall part 32b downwardly projected from a rim of the disc-shaped part 32a. On an outer circumference surface of the outer peripheral wall part 32b holding protrusions formed of a plurality of mound-shaped protrusions extended vertically in a parallel manner on the outer circumference surface of the disc-shaped part 32a, are provided.

In this rotating operation part 32, a marked part 32c is provided on the upper side of the disc-shaped part 32a (top side). The marked part 32c is configured to easily understand the relationship between each of the shooting modes which are switchable by the mode-switching dial 16 and the rotational position of a rotation of the rotating operation part 32 on the rotational axis Ar (rotation around the rotational axis Ar) described below relative to the exterior covering 31 (the housing 11). On the marked part 32c, a plurality of mode-marks 32d indicating each of the shooting modes are provided along the outer circumference of the disc-shaped part 32a, enabling one of the mode-marks 32d to be aligned with a mark (not shown) provided on the exterior covering 31 (the housing 11) by changing the rotational position of the rotating operation part 32. Each of the mode-marks 32d aligns with the mark when the rotating operation part 32 is in a predefined rotational position described below relative to the exterior covering 31 (the housing 11). The rotating operation part 32 has nine mode-marks 32d equiangularly spaced in the rotating direction on the rotational axis Ar (rotating direction of the rotating operation part 32) described below (see FIG. 3), since the number of predefined rotational positions is nine in this embodiment.

The boss section 32e is provided on the reverse side (downside) of the disc-shaped part 32a of the rotating operation part 32. The boss section 32e is formed into a cylindrical shape having a threaded bore 32f inside and protruding from the reverse side of the disc-shaped part 32a. The threaded bore 32f has a thread groove on its inner periphery which is capable of receiving a threaded shaft 38b of a thread part 38 described below and interlocking with its thread ridge.

The thread part 38 is configured to attach the rotating operation part 32 and the mounting plate 33 to the exterior covering 31 (the housing 11), and has a disc-shaped head part 38a and the threaded shaft 38b having a long cylindrical shape and a smaller outside diameter than the head part 38a. The head part 38a has an outside diameter unable to pass through a mounting hole 33a described below of a mounting plate 33. And, the threaded shaft 38b has an outside diameter able to pass through the mounting hole 33a of the mounting plate 33. The threaded shaft 38b has the thread ridge on its outer circumference surface which is capable of interlocking with the thread groove of the threaded bore 32f of the boss section 32e of the rotating operation part 32. The rotating operation part 32 is attached to the exterior covering 31 (the housing 11) by the thread part 38.

Figure 5:
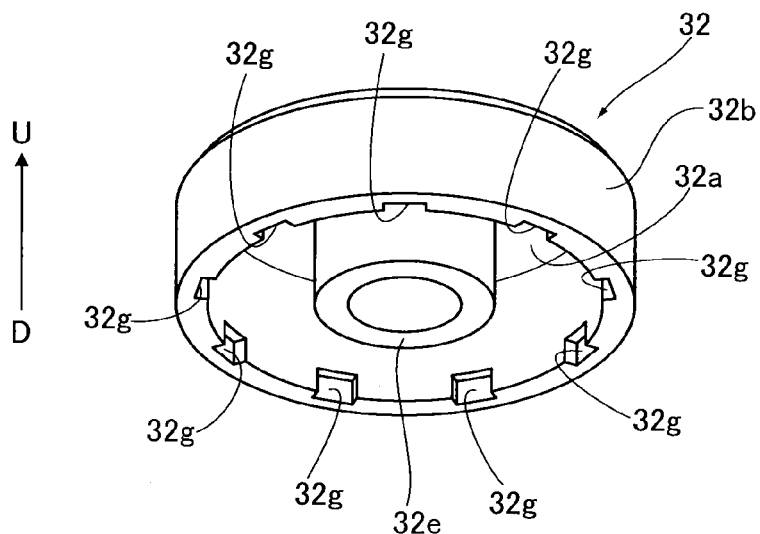
FIG. 5 is a bottom perspective view of a rotating operation part 32.

A locking recess 32g is formed on the reverse side (downside) of the outer peripheral wall part 32b of the rotating operation part 32. The locking recess 32g is configured to lock (fix) the rotation of the rotating operation part 32 relative to the exterior covering 31 (the housing 11) in the predefined rotational position such that one of the mode-marks 32d is aligned with the mark (not shown) of the exterior covering 31 (the housing 11). As shown in FIG. 4, FIG. 5, the locking recess 32g is formed by being partly cutout of the inner periphery wall of the outer peripheral wall part 32b. The locking recess 32g is capable of receiving a projected locking part 41h of a locking part 41c of the locking member 41 (see FIG. 4), and touching against the projected locking part 41h in a rotating direction of the rotating operation part 32. The rotating operation part 32 has nine locking recess 32g equiangularly spaced in rotating direction (see FIG. 5), since the number of predefined rotational positions is nine in this embodiment.

As shown in FIG. 4, the rotating operation part 32 is attached to the exterior covering 31 (the housing 11) with the mounting plate 33. The mounting plate 33 is totally formed into a disc shape, and provided with the mounting hole 33a. As described below, a conductive member 36 is attached to the mounting plate 33, and the conductive member 36 is capable of rotating on the rotational axis Ar integrally with the rotating operation part 32.

The rotating operation part 32 is rotatably attached to the exterior covering 31 (the housing 11) with the mounting plate 33. In detail, the rotating operation part 32 is attached in the rotational recess 31a while receiving the boss section 32e inward of the mounting boss section 31d of the exterior covering 31 (the housing 11), and the mounting plate 33 is put over the reverse side (downside) of the exterior covering 31. In this state, the thread part 38 is inserted upward into the mounting hole 33a of the mounting plate 33 and interlocked with the threaded shaft 38b with the threaded bore 32f of the boss section 32e while putting the head part 38a over the downside of the mounting plate 33. Thereby, the rotating operation part 32 and the mounting plate 33 are capable of rotating together relative to the exterior covering 31 (the housing 11) on the axis of the boss section 32e (mounting boss section 31d) as a center of rotation in a state of tucking the exterior covering 31. Thus, an axis of the boss section 32e (mounting boss section 31d) extending vertically becomes the rotational axis Ar of the rotating operation part 32 rotatably attached to the exterior covering 31 (the housing 11). Note that, the rotating operation part 32 and the mounting plate 33 can be attached to the exterior covering 31 by a heat caulking method and others in place of the thread part 38.

In the rotating operation part 32, the containing space 32h enclosed by the outer peripheral wall part 32b is provided between the reverse side (downside) of the disc-shaped part 32a and the mounting plate 33. The containing space 32h is formed into a ring shape surrounding the boss section 32e in the outer peripheral wall part 32b, with the mounting boss section 31d of the exterior covering 31 (the housing 11) and the spring-loaded wall 31e also being surrounded by the containing space 32*h*. The clicker 34 and the coil spring 35 are also provided in the containing space 32*h* (see FIG. 6).

Figure 6:
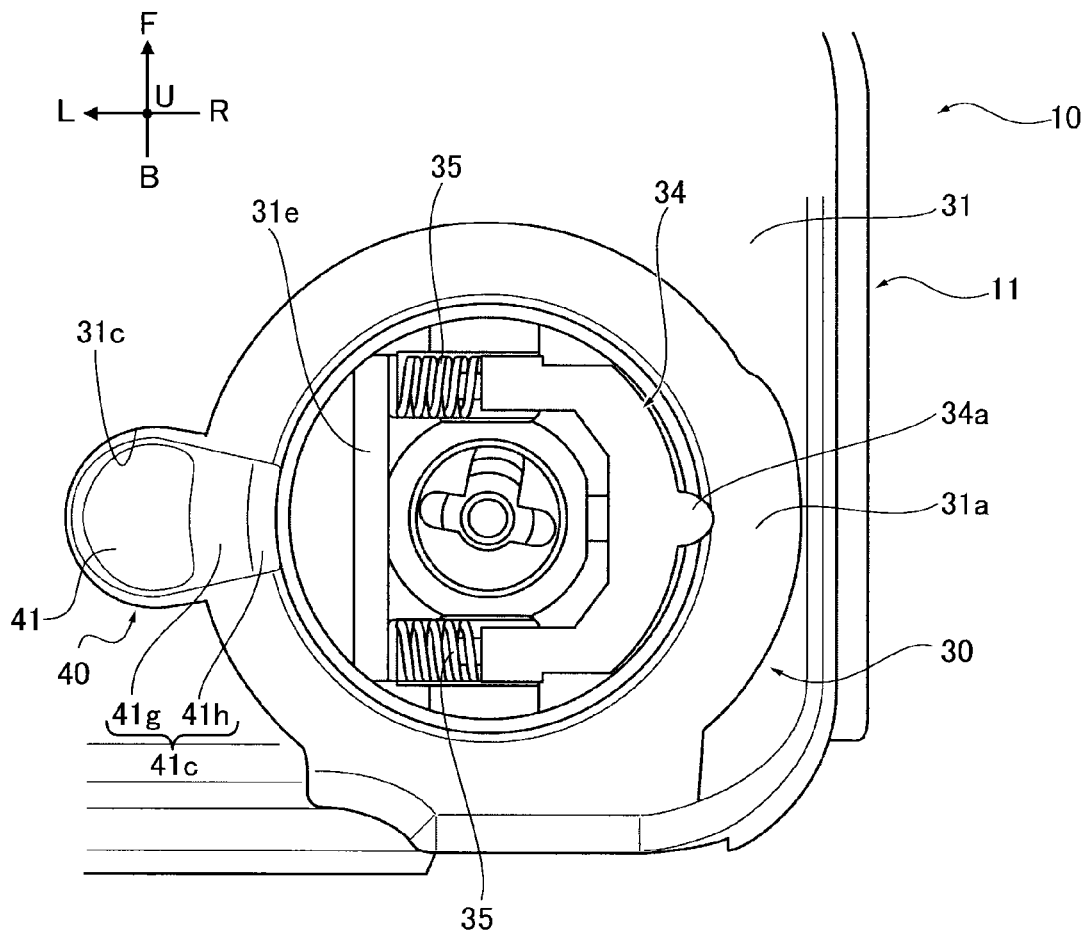
FIG. 6 is a plan view of the rotating switch mechanism 30 where the rotating operation part 32 is omitted.

The clicker 34 is formed into a horseshoe-shape, as shown in FIG. 6, and a projecting part 34*a* is provided in the center thereof. Each of the ends of both coil springs 35 is placed on the clicker 34 at both ends thereof. The other ends of both coil springs 35 are outfitted on the spring-loaded wall 31*e* inserted in the rotating operation part 32, and push the clicker 34 toward the direction that the projecting part 34*a* projects in the exterior covering 31. The projecting part 34*a* is put on a concave-convex surface (not shown) provided inside the rotating operation part 32. The projecting part 34*a* generates a response (clicking feel) indicating that the rotating operation part 32 is in the predefined rotational position by changing a strength needed for the rotating operation of the rotating operation part 32 in cooperation with both coil springs 35.

The conductive member 36 formed of a conductive and elastic material is attached to the mounting plate 33. The conductive member 36 has a plurality of connecting pieces 36*a* projecting downward (see FIG. 4 and FIG. 8). The connecting pieces 36*a* are capable of rotating integrally with the mounting plate 33 and the rotating operation part 32 on the rotational axis Ar relative to the exterior covering 31 since the conductive member 36 is attached to the mounting plate 33. The connecting pieces 36*a* are pressed against a conductive pattern 37*a* of the circuit substrate 37 provided on the inside of the exterior covering 31 and in the rotational recess 31*a*, i.e., a lower part of the rotating operation part 32 rotatably attached. The connecting pieces 36*a* are capable of smoothly moving on the conductive pattern 37*a* along the rotational trajectory on the rotational axis Ar depending on the rotational position of the rotating operation part 32 (the mounting plate 33) while being pressed against the conductive pattern 37*a*.

The circuit substrate 37 is fixed to an inner housing part 39 which is different from the exterior covering 31 of the housing 11. The circuit substrate 37 forms a part of an electronic circuit (not shown) of the rotating switch mechanism 30, i.e., an electronic circuit (not shown) for the mode-switching dial 16 with the conductive member 36 attached to the mounting plate 33. A plurality of the conductive parts are provided on the conductive pattern 37*a* in the circuit substrate 37 and a predefined circuit of the electronic circuit (not shown) mentioned above is in a conduction state when one of the conductive parts is contacted by the connecting pieces 36*a*. The electronic circuit in the rotating switch mechanism 30 including the conductive pattern 37*a* is connected to the control section 21 (see FIG. 2). The control section 21 causes a preset shooting mode to be in a conducted state depending on the detection result when it is detected which conductive parts of the conductive pattern 37*a* are conducted.

Therefore, the predefined rotational position of the rotating operation part 32 on the rotational axis Ar relative to the exterior covering 31 (the housing 11) is the state where the connecting pieces 36*a* contact with one of the conductive parts of the conductive pattern 37. In this embodiment, the rotating operation part 32 has nine predefined rotational positions equiangularly spaced in the rotating direction, and also nine conductive parts of the conductive pattern 37*a* are provided equiangularly spaced in the rotating direction of the rotating operation part 32. Thus, a user can select one shooting mode from among nine types, by conducting one of the conductive parts of the conductive pattern 37*a* by contacting the connecting pieces 36*a*. The content of each of the nine types of shooting modes is preset.

In the rotating switch mechanism 30, the mode-switching dial 16 is formed of the rotating operation part 32 rotatably provided on the exterior covering 31 as the housing 11 on the rotational axis Ar. In the rotating switch mechanism 30, the conducting state of the electronic circuit can be switched by rotating the mode-switching dial 16 (the rotating operation part 32) into the predefined rotational position and thereby the contact location relative to the conductive pattern 37*a* (each of the conductive parts thereof) of the circuit substrate 37 is changed by rotating of the connecting pieces 36*a* of the conductive member 36 fixed to the mounting plate 33. Here, in the rotating switch mechanism 30, the marked part 32*c* indicating that the rotating operation part 32 is in the predefined rotational position corresponding to each of the shooting modes by the alignment of the mark (not shown) of the housing 11 and one of the mode-marks 32*d* is provided on the rotating operation part 32. This makes selecting an intended shooting mode easier.

A locking mechanism 40 is provided on the rotating switch mechanism 30. The locking mechanism 40 is basically configured to lock the rotating operation part 32 relative to the housing 11 (the exterior covering 31). In this embodiment, the locking mechanism locks the rotation of the rotating operation part 32 relative to the housing 11 (the exterior covering 31) at one of the predefined rotational positions. The locking mechanism 40 has the locking member 41 and a locking elastic member 42.

As shown in FIG. 4 and FIG. 9 to FIG. 11, the locking member 41 has a size capable of inserting into the locking operation recess 31*c* provided on the exterior covering 31 (the housing 11) and is formed of an operating part body 41*a* which is cylindrically-shaped having an inclined member 41*b*, a locking part 41*c*, and a guiding leg part 41*d*. The operating part body 41*a* is partially circular and capable of being adjacent to the rotating operation part 32 without disturbing the rotation thereof (see FIG. 3). The operating part body 41*a* is closed at one end and a receiving hole 41*e* which is cylindrically-shaped and opened at the other end is provided therein. The receiving hole 41*e* has a size capable of receiving the locking elastic member 42 telescopically. The operating part body 41*a* has the inclined member 41*b* at a lower end (downside end).

The inclined member 41*b* is provided on the side which is adjacent to the rotating operation part 32 in the outer circumference surface of the operating part body 41*a*, and formed of a triangular pole shape which projects leftward from the outer circumference surface (the operating part body 41*a*) and further projects at the lower end. The inclined member 41*b* forms the lock-side incline 41*f* around the operating part body 41*a* in the longitudinal direction. The lock-side incline 41*f* is a shallow slope inclined to the lower left-hand side.

The locking part 41*c* is provided on the operating part body 41*a* at the lower end of (downward end) the side adjacent to the rotating operation part 32. The locking part 41*c* has the arm part 41*g* projected rightward from the operating part body 41*a* and the projected locking part 41*h* upwardly projected. The arm part 41*g* allows the projected locking part 41*h* to insert into the locking recess 32*g* of the rotating operation part 32 under the rotating operation part 32 (the outer peripheral wall part 32*b* thereof) (see FIG. 4). The projected locking part 41*h* is capable of inserting into each of the locking recesses 32*g* of the rotating operation part 32, and touching against the locking recess 32*g* in the rotational direction of the rotating operation part 32.

Figure 11:
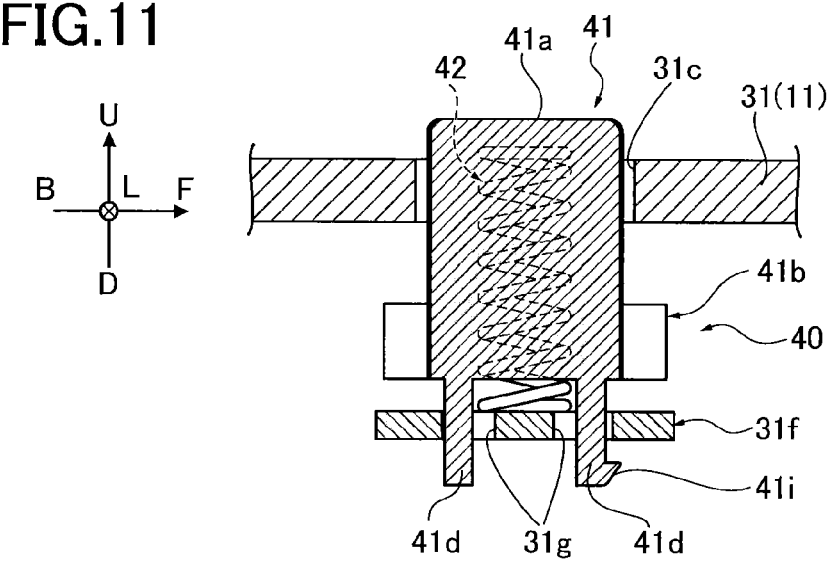
FIG. 11 is a sectional side view of the locking member 41 movably attached to an exterior covering 31 (a locking operation recess 31c thereof) along the line in FIG. 1B.

As shown in FIG. 11, the guiding leg parts 41*d* are formed of a columnar shape and project downwardly from the lower end of the operating part body 41*a* and the locking part 41*c*, and are provided as a pair in a front-back direction. Both of the guiding leg part 41*d* can be inserted into a pair of the guide holes 31g of the spring retainer plate 31f of the locking operation recess 31c provided on the exterior covering 31 (the housing 11). A moving direction of the locking member 41 relative to the exterior covering 31 (the housing 11) is guided in the vertical direction by both of the guiding leg parts 41d being inserted in the corresponding guide holes 31g respectively. Furthermore, one of the guiding leg parts 41d has a retaining part 41i at the projected end (downward end) so as to prevent falling off from the guide holes 31g.

Thereby, the locking member 41 is provided on the exterior covering 31 (the locking operation recess 31c thereof) as to be able to move vertically relative to the exterior covering 31 (the housing 11) within a predefined range since the operating part body 41a is inserted into the locking operation recess 31c and the pair of guiding leg parts 41d are inserted into the pair of the guide holes 31g of the spring retainer plate 31f in the locking operation recess 31c. Moreover, there is a positional relationship wherein the projected locking part 41h of the locking part 41c goes into the locking recess 32g of the rotating operation part 32 when the locking member 41 is in the upper limit of the predefined range of movement (see FIG. 4 and FIG. 7) and the projected locking part 41h of the locking part 41c falls out from the locking recess 32g of the rotating operation part 32 when the locking member 41 is in the lower limit of the predefined range of movement (see FIG. 15). Here, the rotation of the rotating operation part 32 relative to the exterior covering 31 (the housing 11) can be locked (fixed) when the projected locking part 41h of the locking part 41c goes into the locking recess 32g of the rotating operation part 32, since the projected locking part 41h touches the locking recess 32g in a rotating direction of the rotating operation part 32. Thereby, in the locking member 41 (the locking mechanism 40), the upper limit of the predefined range of movement is the locking position locking the rotation of the rotating operation part 32 relative to the exterior covering 31 (the housing 11), and the lower limit of the predefined range of movement is the releasing position releasing the lock of the rotation of the rotating operation part 32 relative to the exterior covering 31 (the housing 11). In this embodiment, the locking member 41 is formed of a size such that the upper surface thereof becomes flush with surrounding members (an upper surface of the rotating operation part 32 (surface of the marked part 32c) and a periphery of the locking operation recess 31c of the exterior covering 31) when the locking member 41 is in the releasing position (see FIG. 15).

The operating part body 41a of the locking member 41 has the locking elastic member 42 in the receiving hole 41e. The locking elastic member 42 is formed of a compression spring wherein one end is farthest from another end by an elastic force in a no-load state. The locking elastic member 42 has a size enabling it to be inserted into the receiving hole 41e of the operating part body 41a. Furthermore, the locking elastic member 42 is inserted into the receiving hole 41e of the locking member 41 provided in the locking operation recess 31c of the exterior covering 31 and is pressed by the spring retainer plate 31f of the locking operation recess 31c as mentioned above. Thereby, the locking elastic member 42 presses upwardly the locking member 41 toward the spring retainer plate 31f of the locking operation recess 31c i.e., the exterior covering 31. Therefore, the locking member 41 is in the upper end position (fixed position) of the predefined range of the movement relative to the exterior covering 31 (the housing 11) when there is no force except the elastic force exerted by the locking elastic member 42. The locking member 41 is pressed downwardly relative to the exterior covering 31 (the housing 11) by pressure exerted by the locking elastic member 42 into the lower position (the releasing position) of the predefined range of the movement (the releasing position). The on/off lever 14 is provided to the imaging device 10 in association with the locking member 41.

Figure 12A:
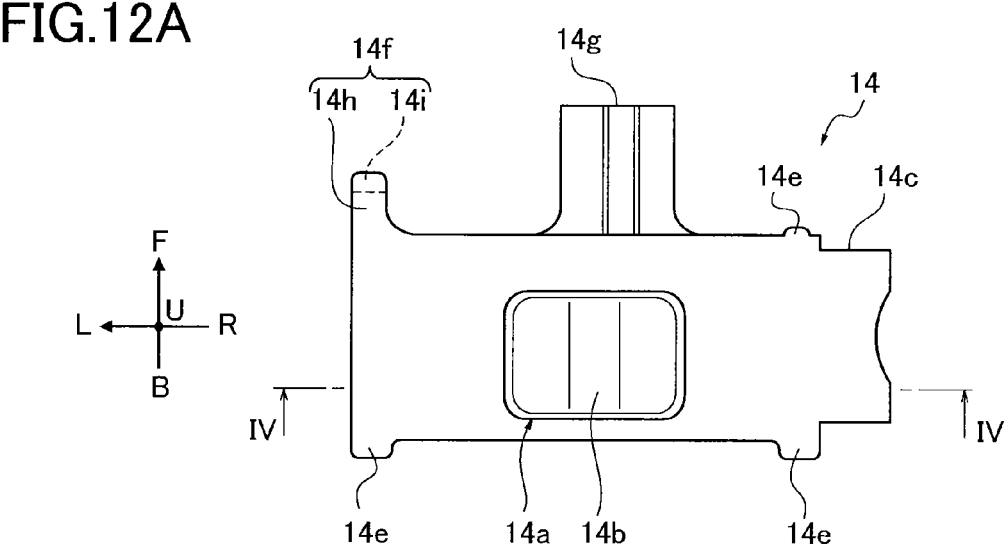
FIG. 12A is a plan view of the on/off lever 14 interlocked with the rotating switch mechanism 30.
Figure 12B:
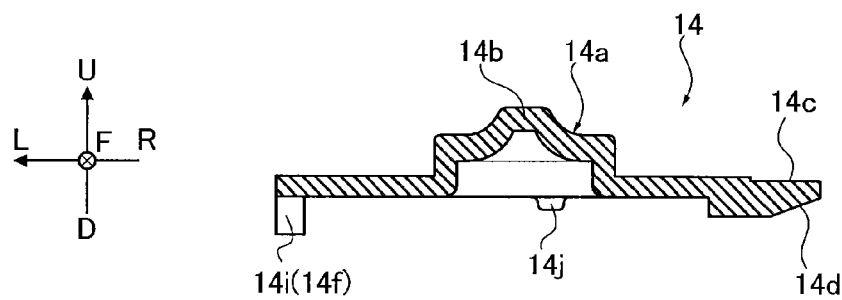
FIG. 12B is a sectional side view of the on/off lever 14 along the line IV-IV in FIG. 12A.
Figure 12C:
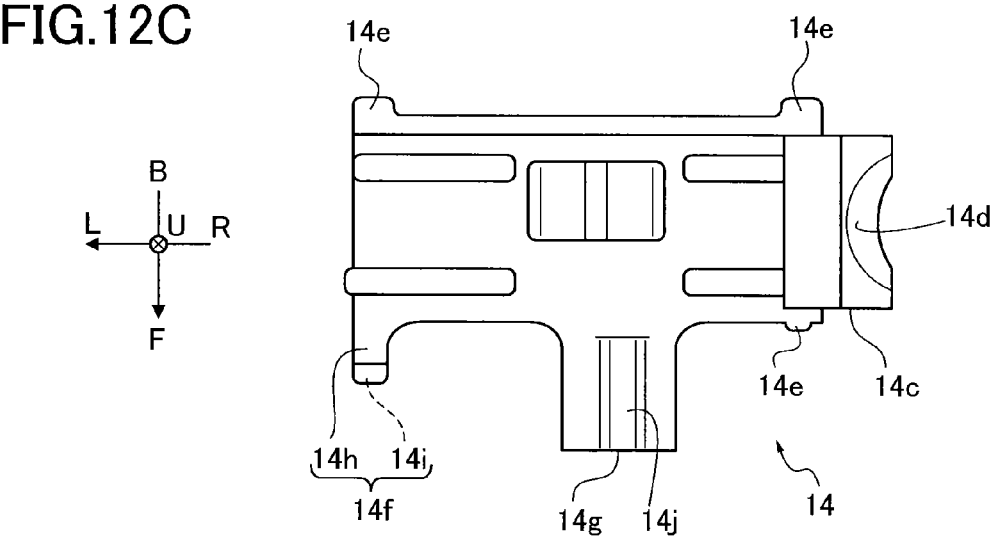
FIG. 12C is a bottom plan view of the on/off lever 14.
Figure 13A:
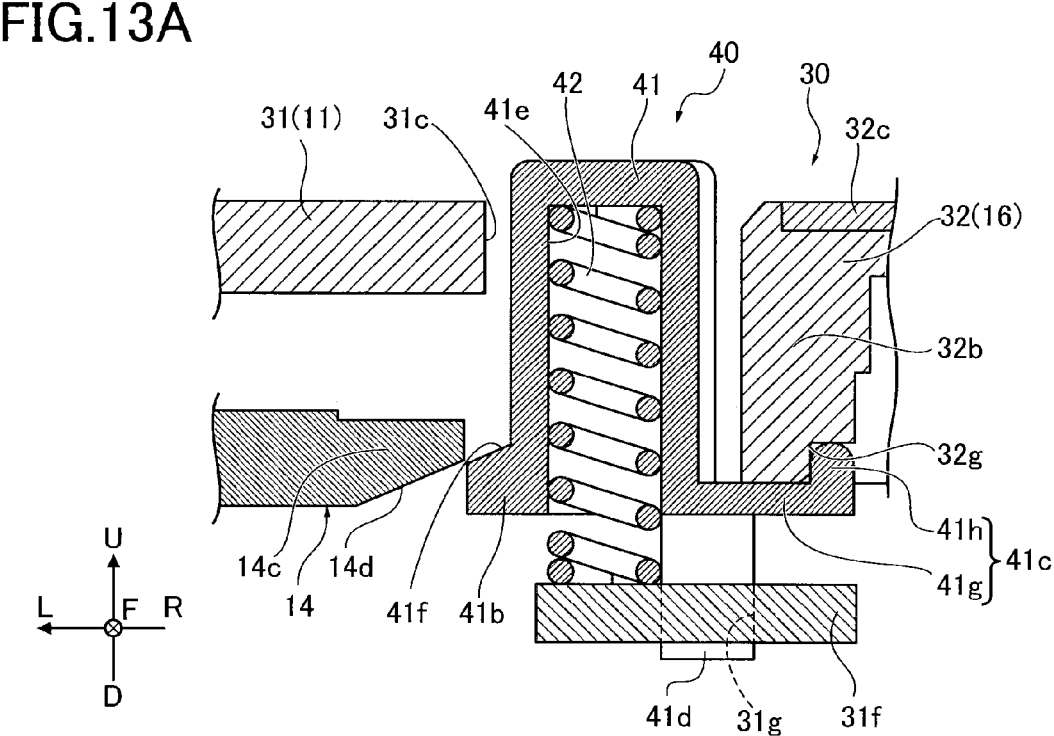
FIG. 13A is a sectional side view of FIG. 3 along the line V-V in FIG. 3 illustrating the relationship between the locking member 41 (a lock-side inclined surface 41f thereof) attached to the exterior covering 31 (the housing 11) and the on/off lever 14 (a lever-side inclined surface 14d thereof)
Figure 13B:
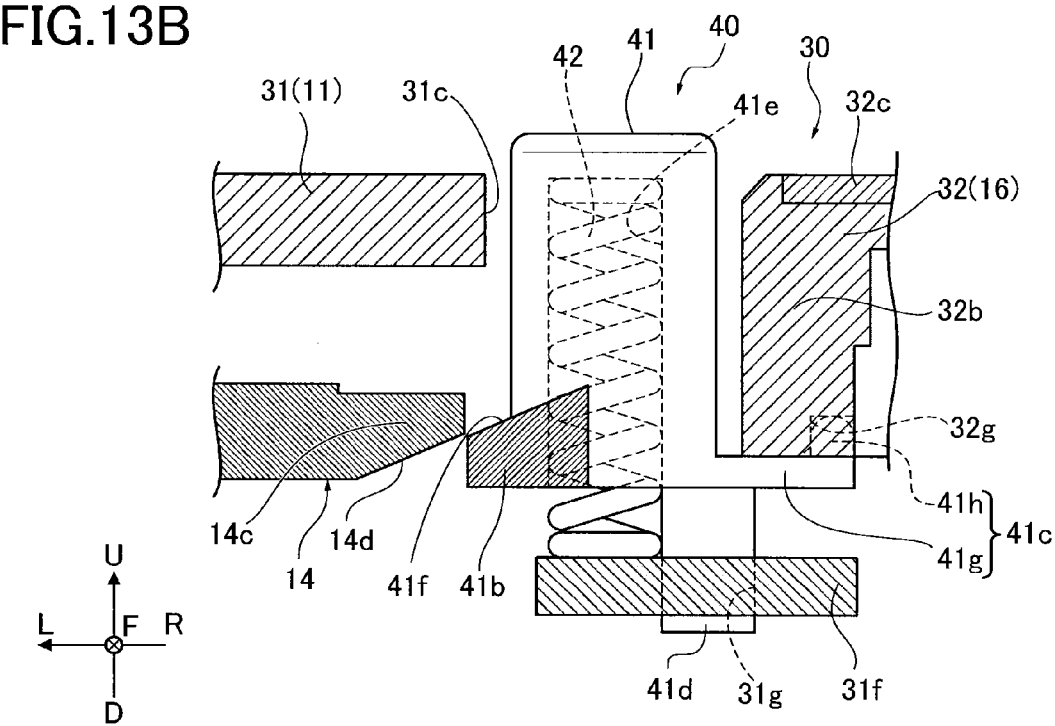
FIG. 13B is a sectional side view of FIG. 3 along the line VI-VI in FIG. 3 illustrating the relationship between the locking member 41 (the lock-side inclined surface 41f thereof) attached to an the exterior covering 31 (the housing 11) and the on/off lever 14 (the lever-side inclined surface 14d thereof)

The on/off lever 14 is provided on a power switch mechanism 50 as an operation member to turn on/off the power of the imaging device 10. Namely, the on/off lever 14 is a switching member to switch an operating state and a non-operating state of the imaging device 10, and provided on the exterior covering 31 (the housing 11) movably between the operating position putting the imaging device 10 into the operating state and the non-operating position putting the imaging device 10 into the non-operating state. The on/off lever 14 is formed in a long-plate shape in a right and left direction, as shown in FIG. 12A to C. A lever protrusion 14a is provided on the top side (front side of FIG. 12A) of the on/off lever 14.

On the center part of the on/off lever 14, the lever protrusion 14a projecting upwardly is formed. Furthermore, a lever piece 14b partially projecting upwardly is formed on the center part of a long side of the lever piece 14b. The lever protrusion 14a has a size and position capable of being inserted into an inner side of the on/off lever aperture 31b of the exterior covering 31 when being attached to the exterior covering 31 (the housing 11) as described below (see FIG. 7). The lever protrusion 14a has a size and position capable of moving vertically (the longitudinal direction in the on/off lever aperture 31b) within the on/off lever aperture 31b (see FIG. 3, FIG. 14). In this embodiment, the lever protrusion 14a is formed in a rectangular parallelepiped shape wherein the dimension of the right-left direction is longer than the dimension of the front-back direction while the lever piece 14b is formed in a rectangular parallelepiped shape wherein the dimension of the front-back direction is longer than the dimension of the right-left direction.

A hooking piece 14c is provided on the right end of the on/off lever 14. The hooking piece 14c is projected rightward (right end in the longitudinal direction of the on/off lever 14), and the back side (lower side) of the projected end is cut off so that its thickness decreases as it approaches the right end. Therefore, the hooking piece 14c forms a lever-side incline 14d as the shallow slope toward the lower left. The projected end of the hooking piece 14c is split at the intermediate position of the Z-axis into a two-pronged shape. In the locking member 41, the lever-side incline 14d is formed of a shape fitting into the lock-side incline 41f formed of the inclined member 41b formed around the operating part body 41a. The lever-side incline 14d of the on/off lever 14 is opposed to the lock-side incline 41f of the locking member 41 (see FIG. 7 and FIG. 13A,B) when attached to the exterior covering 31 (the housing 11) as described below. An inclination angle between the lever-side incline 14d and the horizontal plane is equal to the inclination angle between the lock-side incline 41f and the horizontal plane. Thus, flat surfaces of the lever-side incline 14d and the lock-side incline 41f can contact with each other when they come close (see FIG. 15).

The on/off lever 14 has three guiding protrusions 14e, an on/off switching piece 14f, and a retaining piece 14g. Each of the guiding protrusion 14e enables the on/off lever 14 to move in the right-left direction relative to the exterior covering 31 (the housing 11) when the on/off lever 14 is arranged to the exterior covering 31. Each of the guiding protrusions 14e is projected from the lateral side perpendicular to the front-back direction of the on/off lever 14, wherein one of them is provided on the front side and the other two are provided on the back side. Each of the guiding protrusions 14e can be inserted in guide troughs (not shown) provided on the reverse side (downside) of the exterior covering 31 and enable the on/off lever 14 to move in the right-left direction relative to the exterior covering 31 (the housing 11) while limiting the distance of movement in cooperation with each of the guide troughs.

The on/off switching piece 14f is configured to operate a switching part 51b of a switching equipment 51 described below when the on/off lever 14 is moved in the right-left direction relative to the exterior covering 31 (the housing 11). The on/off switching piece 14f has an arm 14h projected from the front lateral side of the on/off lever 14 and a projecting hook portion 14i projected from the projected end of the projecting hook portion 14i. The arm 14h enables the projecting hook portion 14i to touch the switching part 51b of the switching equipment 51 in the right-left direction. The projecting hook portion 14i inclines the switching part 51b by touching the switching part 51b, as described below.

The retaining piece 14g is basically provided in order to hold the operating position of the on/off lever 14 as the switching member, in this embodiment, provided in order to hold both of the operating position and the non-operating position of the on/off lever 14. The retaining piece 14g is formed in a plate shape projected from the center part of the front lateral side of the on/off lever 14, and has a holding projection portion 14j at an intermediate position in the right-left direction. The holding projection portion 14j is partially projected downwardly from the retaining piece 14g, and formed in a rectangular parallelepiped shape where the dimension of the front-back direction is longer than the dimension of the right-left direction.

Figure 7:
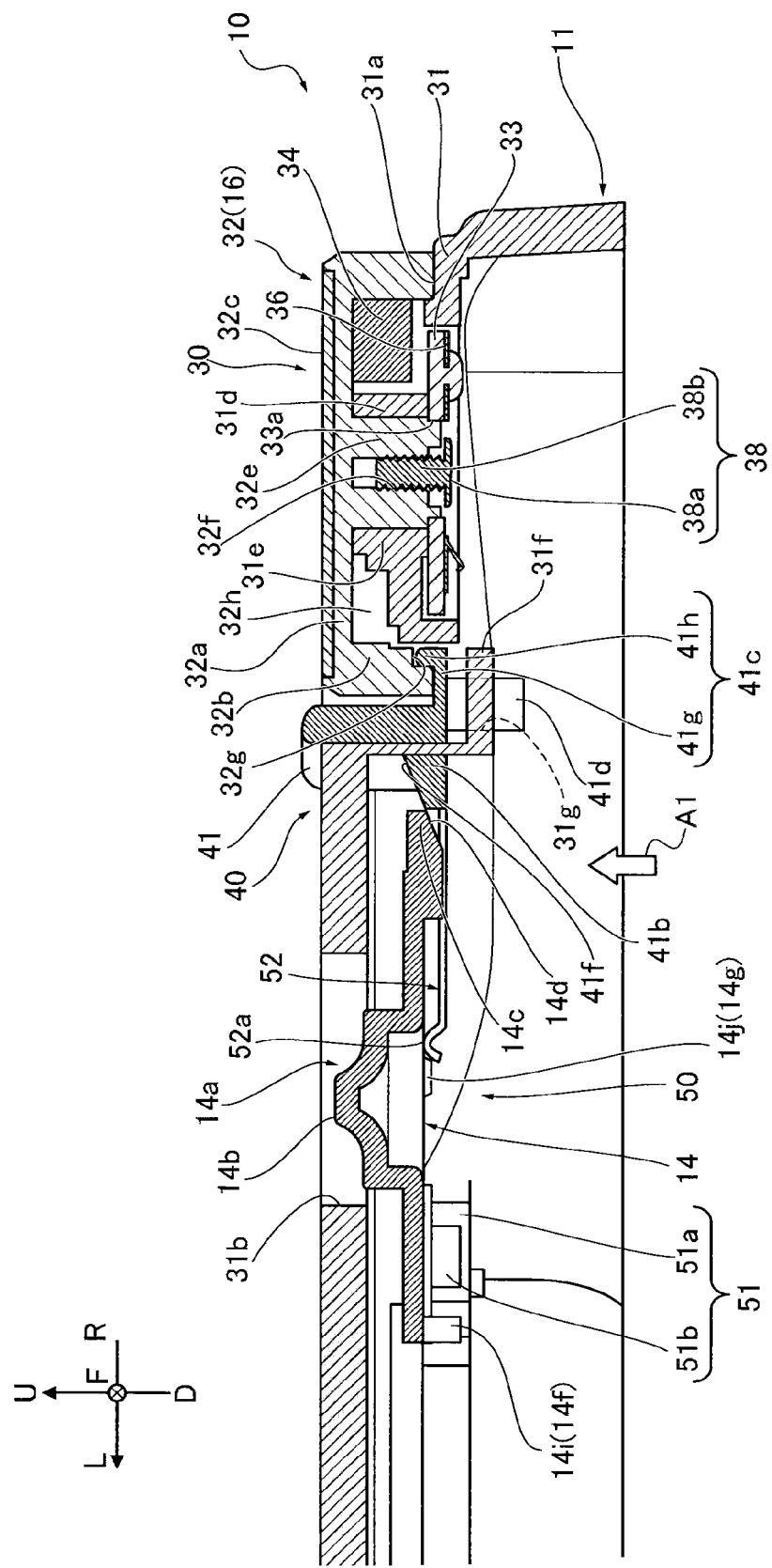
FIG. 7 is a cross-sectional view along the line II-II in FIG. 3 where a circuit substrate 37 and an inner housing 39 are omitted.
Figure 8:
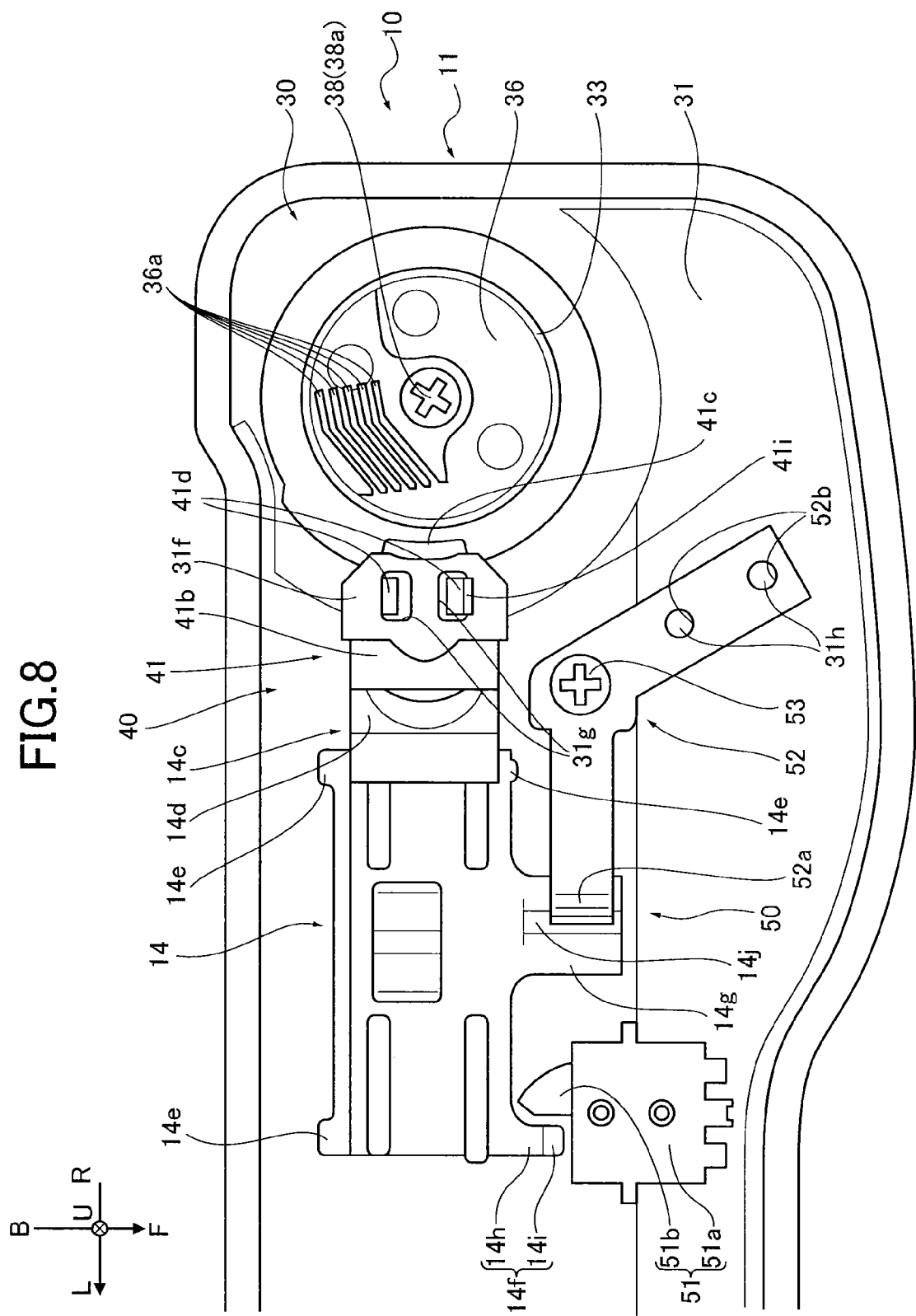
FIG. 8 is a plan view of FIG. 7 in the direction of an arrow A1 shown in FIG. 7.
Figure 9:
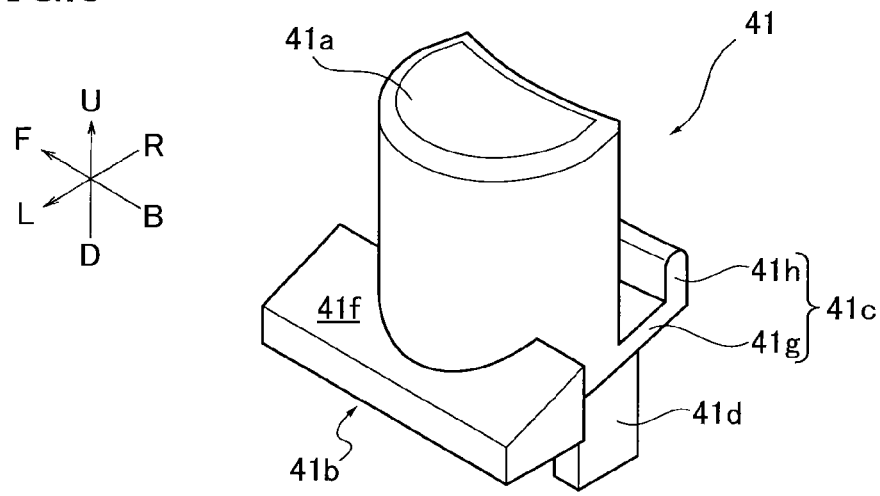
FIG. 9 illustrates a locking member 41.
Figure 10:
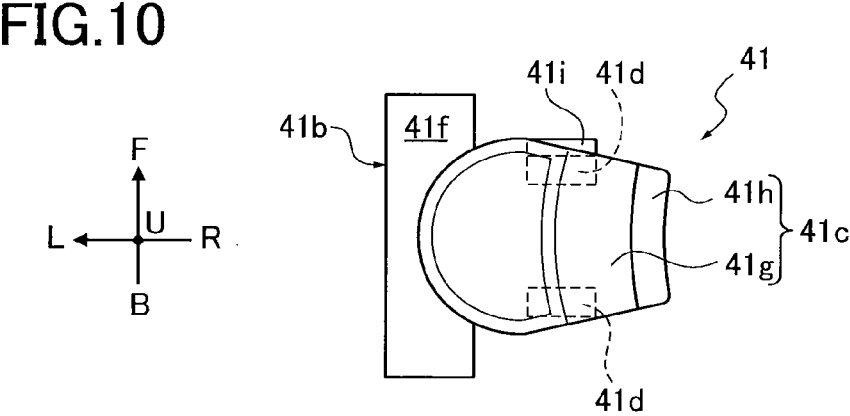
FIG. 10 is a plan view of the locking member 41.

As shown in FIG. 7 and FIG. 8, the power switch mechanism 50 has switching equipment 51. The switching equipment 51 is configured to switch the power of the imaging device 10, that is to say, to switch the operating state and the non-operating state of the imaging device 10, by the movement of the on/off lever 14 as the switching member in the right-left direction. The switching equipment 51 has a switching body 51a and a switching part 51b. The switching body 51a is mounted on the switch substrate by connecting electrically its connecting terminal to an electrode region (not shown). The switch substrate is connected to the control section 21 (see FIG. 2). The switching body 51a holds the switching part 51b while enabling it to be inclined between a default position (see FIG. 8) where the switching part 51b is most projected and an inclined position (see FIG. 16) where the switching part 51b is most inclined. In this embodiment, the switching body 51a is configured such that the switching part 51b is inclined to the inclined position (see FIG. 16) when the switching part 51b is pressed rightward, and return to the initial position (the default position (see FIG. 8)) when released from the pressure.

Figure 16:
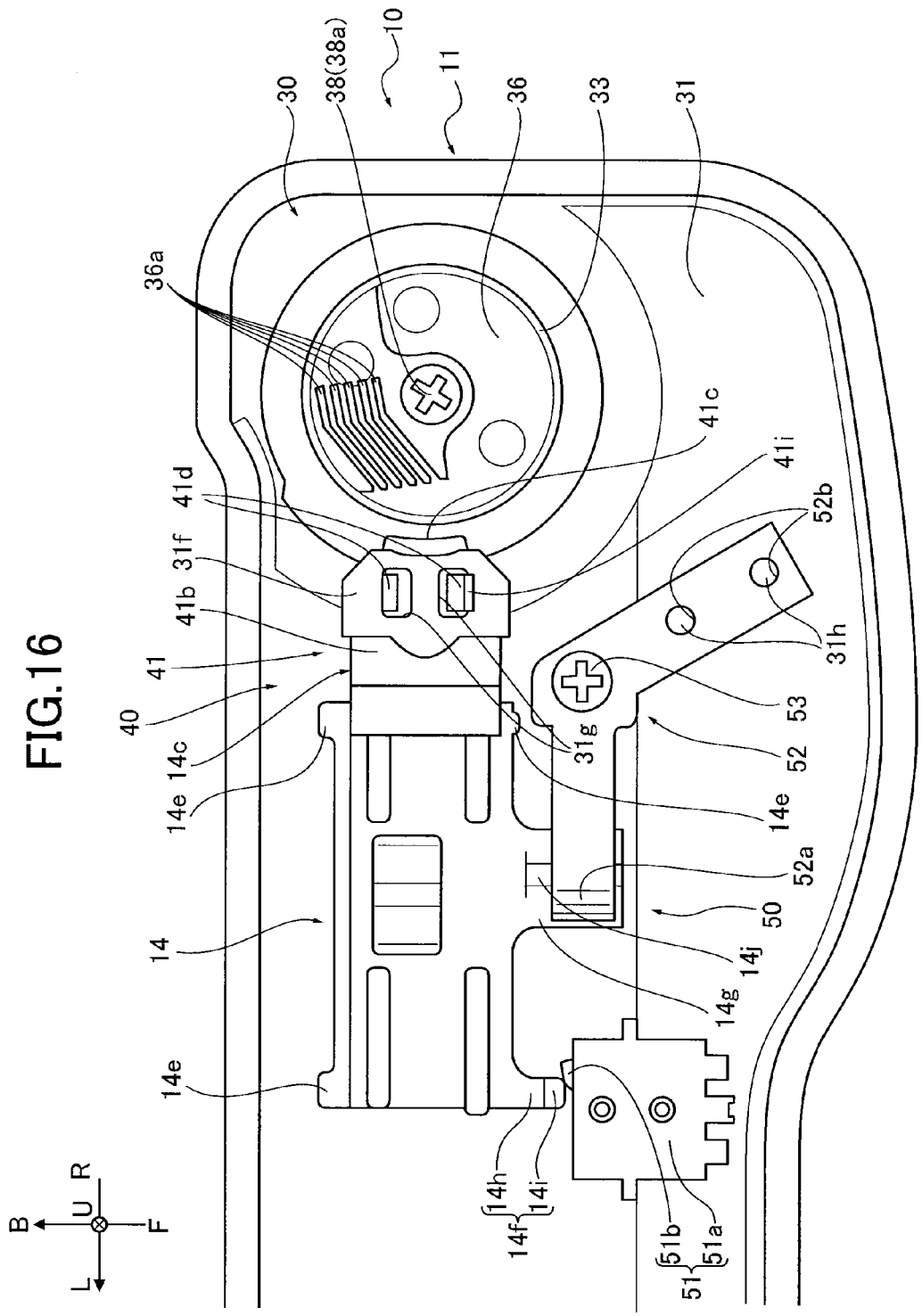
FIG. 16 illustrates the on/off lever 14 in the operating state (power-on) in the same manner as FIG. 8.

The switching equipment 51 outputs the operation signal in cooperation with the switch substrate (electronic circuit thereon) when the switching part 51b is inclined relative to the switching body 51a (see FIG. 16). In detail, the switching equipment 51 outputs a press-down operation signal to the control section 21 (see FIG. 2) when the switching part 51b is in the inclined position (see FIG. 16) relative to the switching body 51a, while stopping outputting of the press-down operation signal to the control section 21 (see FIG. 2) when the switching part 51b is in the default position (see FIG. 8) relative to the switching body 51a. The control section 21 starts-up the imaging device 10 (control mechanism (main circuit) thereof) into the operating state when the press-down operation signal is inputted from the switching equipment 51. The control section 21 shuts-down the imaging device 10 (control mechanism (main circuit)) into the non-operating state when the press-down operation signal from the switching equipment 51 is stopped. Thus, the press-down operation signal outputted from the switching equipment 51 acts as a start-up operation signal, and acts as a shut-down operation signal by stopping the press-down operation signal outputted from the switching equipment 51.

The switching equipment 51 is attached to the reverse side (downside) of the exterior covering 31 (the housing 11) close to the on/off switching piece 14f of the on/off lever 14 movably provided in a right-left direction. The switching equipment 51 is in a position such that there is no interference between the on/off switching piece 14f (the projecting hook portion 14i) and the switching part 51b (see FIG. 8) when the on/off lever 14 is in the leftmost position of the limited movement by each of the guiding protrusions 14e of the on/off lever 14 and the guide troughs provided on the exterior covering 31 working together. Moreover, in the switching equipment 51, the switching part 51b is inclined to the inclined position by interference between the projecting hook portion 14i of the on/off switching piece 14f and the switching part 51b when the on/off lever 14 is in the rightmost position of the limited movement (see FIG. 16).

Therefore, in the power switch mechanism 50, the switching part 51 of the switching equipment 51 can be put into the default position (see FIG. 8) by moving the on/off lever 14 to the leftmost position of the limited movement. Thus, in the power switch mechanism 50, the imaging device 10 is in the non-operating state when the on/off lever 14 (the lever piece 14b thereof) is in the leftmost position of the limited movement, and the leftmost position is the non-operating position of the on/off lever 14 (the switching member). Furthermore, the switching part 51b of the switching equipment 51 can be put into the inclined position (see FIG. 16) through the lever piece 14b of the on/off lever 14, by moving the on/off lever 14 to the rightmost position in the limited movement. Therefore, in the power switch mechanism 50, the imaging device 10 is in the operating state when the on/off lever 14 (the lever piece 14b thereof) is in the rightmost position, and the rightmost position is the operating position of the on/off lever 14 (the switching member).

The power switch mechanism 50 has a holding elastic member 52 (see FIG. 8, FIG. 16). The holding elastic member 52 is basically configured to hold the on/off lever 14 as the switching member at the operating position, and in this embodiment, configured to hold the on/off lever 14 at the operating position and also at the non-operating position. The holding elastic member 52 is formed in the long-plate shape in the horizontal plane in this embodiment, and formed of a plate spring having an elastic force against the deformation movement in the vertical direction of a holding projection portion 52a provided on one end thereof. The holding projection portion 52a is formed such that one end of the holding elastic member 52 extended in the right-left direction is projected upwardly in an arc shape (see FIG. 7 and FIG. 15).

The holding elastic member 52 is fixed on the reverse side of the exterior covering 31 (the housing 11) at the intermediate position in a longitudinal direction by the thread part 53 as shown in FIG. 8 and FIG. 16. At that time, in the holding elastic member 52, a rotation around the thread part 53 as an axis relative to the exterior covering 31 is prevented by receiving a pair of the positioning protrusions 31h provided on the exterior covering 31 into a pair of locating holes 52b on the other end in the longitudinal direction. In this state, the holding projection portion 52a is pressed upward against the retaining piece 14g of the on/off lever 14, and opposed to the holding projection portion 14j in the right-left direction.

The holding projection portion 52a of the holding elastic member 52 is pressed against the retaining piece 14g at the right side of the holding projection portion 14j (see FIG. 7 and FIG. 8) when the on/off lever 14 is in the non-operating position. Thus, the movement of the on/off lever 14 rightward (the operating position) is prevented by the holding projection portion 52a interfering with the holding projection portion 14j from the right side in the right-left direction. Moreover, the holding projection portion 52a of the holding elastic member 52 is pressed against the retaining piece 14g at the left side of the holding projection portion 14j (see FIG. 16) when the on/off lever 14 is in the operating position. Thus, the movement of the on/off lever 14 leftward (the non-operating position) is prevented by the holding projection portion 52a interfering with the holding projection portion 14j from the left side in the right-left direction. If the movement force of the on/off lever 14 exceeds the elastic force of the holding elastic member 52 when the on/off lever 14 moves between the non-operating position and the operating position, the holding projection portion 52a touching the holding projection portion 14j in the right-left direction is forced downward by the holding projection portion 14j and elastically-deformed, overcomes the holding projection portion 14j by an elastic deformation, and is restored to its former state by an elastic force. Thus, in the holding elastic member 52, the presence of the on/off lever 14 in both the operating position and the non-operating position can be held by the retaining piece 14g of the on/off lever 14 and the holding projection portion 14j working together. Furthermore, when the on/off lever 14 is moved between the operating position and the non-operating position, a response (clicking feel) that the on/off lever 14 is in the operating position or in the non-operating position can be produced by varying the required force for operating the on/off lever 14. Thus, the holding elastic member 52 allows the movement of the on/off lever 14 between the operating position and the non-operating position (switching the operating state and the non-operating state of the imaging device 10 by the on/off lever 14), and functions as a holding mechanism part for holding the on/off lever 14 at the operating position, in cooperation with the retaining piece 14g and the holding projection portion 14j of the on/off lever 14.

As shown in FIG. 4, in the imaging device 10, the locking mechanism 40 is provided on the exterior covering 31 by inserting a pair of guiding leg parts 41d of the locking member 41 receiving the locking elastic member 42 in the receiving hole 41e into a pair of the guide holes 31g of the spring retainer plate 31f of the locking operation recess 31c of the exterior covering 31 (the housing 11) and placing the locking elastic member 42 to the spring retainer plate 31f. Furthermore, the rotating switch mechanism 30 is provided on the exterior covering 31 by fixing the circuit substrate 37 on an inner housing part 39 of the housing 11 and rotatively attaching the rotating operation part 32 having the clicker 34 and the coil spring 35 (see FIG. 6) in the rotational recess 31a of the exterior covering 31 (the housing 11) with the mounting plate 33 being attached the conductive member 36. Moreover, as shown in FIG. 7 and FIG. 8, the on/off lever 14 is provided on the exterior covering 31 movably in the right-left direction and in the predefined range by inserting each of the guiding protrusions 14e of the on/off lever 14 into the inward of the corresponding guide trough (not shown) of the reverse side of the exterior covering 31 and inserting the lever protrusion 14a (the lever piece 14b) of the on/off lever 14 into the inward of the on/off lever aperture 31b of the exterior covering 31. Next, the power switch mechanism 50 is provided on the exterior covering 31 by attaching the switching equipment 51 on the reverse side of the exterior covering 31 and fixing the holding elastic member 52 receiving both of the positioning protrusions 31h of the exterior covering 31 inward in both of the locating holes 52b by the thread part 53 in the positional relationship mentioned above.

Therefore, as shown in FIGS. 1A,B, in the imaging device 10, the mode-switching dial 16 is formed of the rotating operation part 32 of the rotating switch mechanism 30 rotatively provided on the rotational recess 31a on the top side of the exterior covering 31 (the housing 11). Moreover, the top portion of the locking member 41 of the locking mechanism 40 exposed from the exterior covering 31 of the locking operation recess 31c is arranged adjacent to the mode-switching dial 16 (the rotating operation part 32). Furthermore, the lever protrusion 14a (the lever piece 14b) of the on/off lever 14 of the power switch mechanism 50 is exposed from the on/off lever aperture 31b of the exterior covering 31. When the on/off lever 14 is in the non-operating position, the lever protrusion 14a is moved to the leftmost end in the on/off lever aperture 31b and the lever piece 14b is placed at the leftward position (see FIG. 8). When the on/off lever 14 is in the operating position, the lever protrusion 14a is moved to the rightmost end in the on/off lever aperture 31b and the lever piece 14b is placed at the rightward position (see FIG. 16). Therefore, in the power switch mechanism 50 (the imaging device 10), moving the lever piece 14b (the lever protrusion 14a) of the on/off lever 14 leftward in the on/off lever aperture 31b of the exterior covering 31 is the shut-down operation putting the imaging device 10 into the non-operating state, and moving the lever piece 14b (the lever protrusion 14a) rightward in the on/off lever aperture 31b is the start-up operation putting the imaging device 10 into the operating state.

Here, the locking member 41 can move vertically relative to the exterior covering 31 between the locking position (see FIG. 7) in which the projected locking part 41h of the locking part 41c is inserted into the locking recess 32g of the rotating operation part 32 and the releasing position (see FIG. 15) in which the projected locking part 41h is removed from the locking recess 32g. As mentioned above, the on/off lever 14 is movable in the right-left direction on the reverse side of the exterior covering 31 between the operating position (see FIG. 15, FIG. 16) where the switching part 51b of the switching equipment 51 is inclined into the inclined position by the on/off switching piece 14f (the projecting hook portion 14i) and the non-operating position (see FIG. 7 and FIG. 8) where the switching part 51b is in the default position since the lever piece 14b does not touch the switching part 51b.

Then, as shown in FIG. 3, FIG. 7, FIG. 8, and FIGS. 13A,B, the lock-side incline 41f formed of the inclined member 41b of the locking member 41 and the lever-side incline 14d formed of the hooking piece 14c of the on/off lever 14 are opposed to each other in the right-left direction without contact when the on/off lever 14 is in the non-operating position. Thus, the locking member 41 is put into the locking position by a pressure of the locking elastic member 42.

Figure 14:
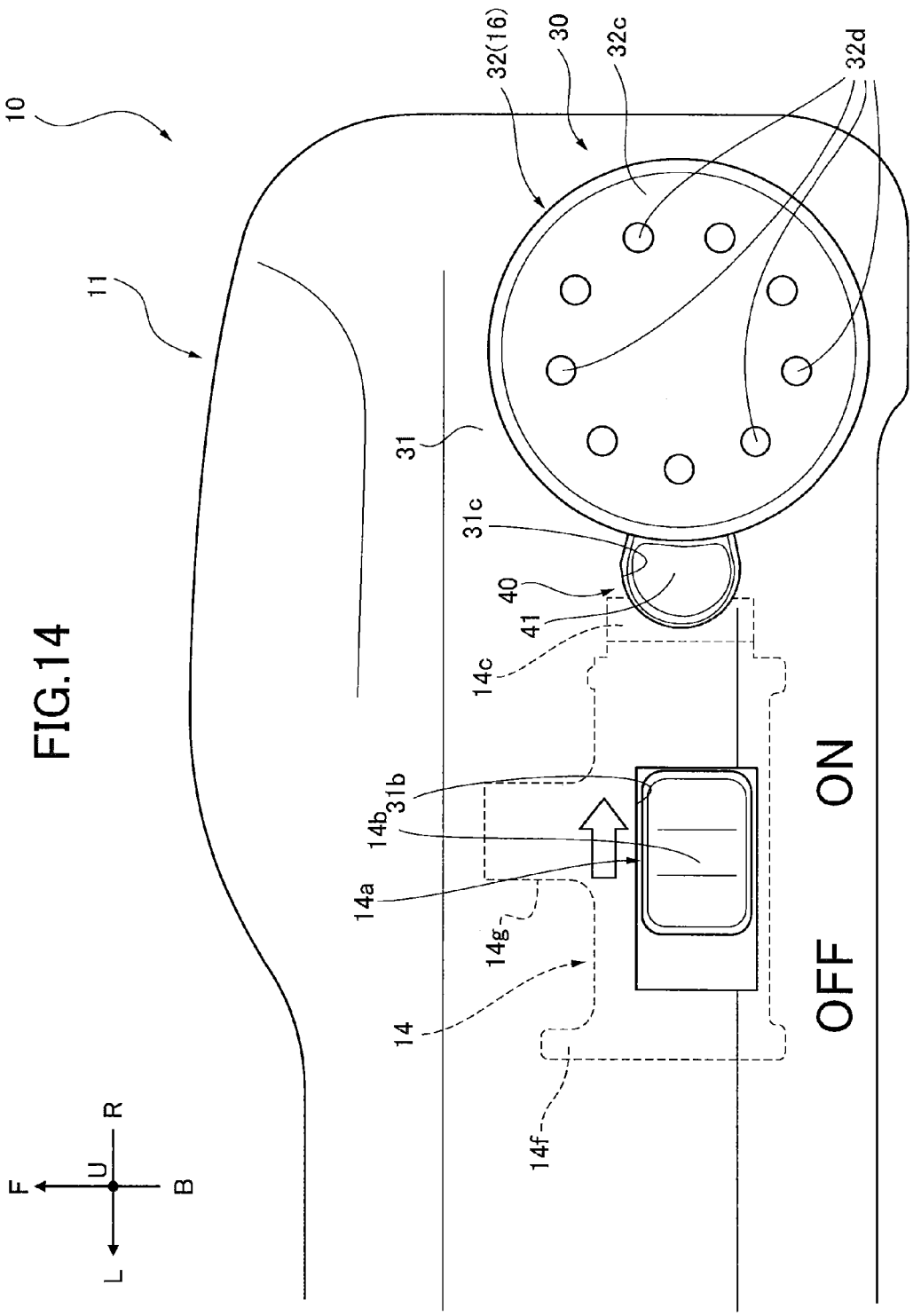
FIG. 14 illustrates the on/off lever 14 in an operating state (power-on) in the same manner as FIG. 3.
Figure 15:
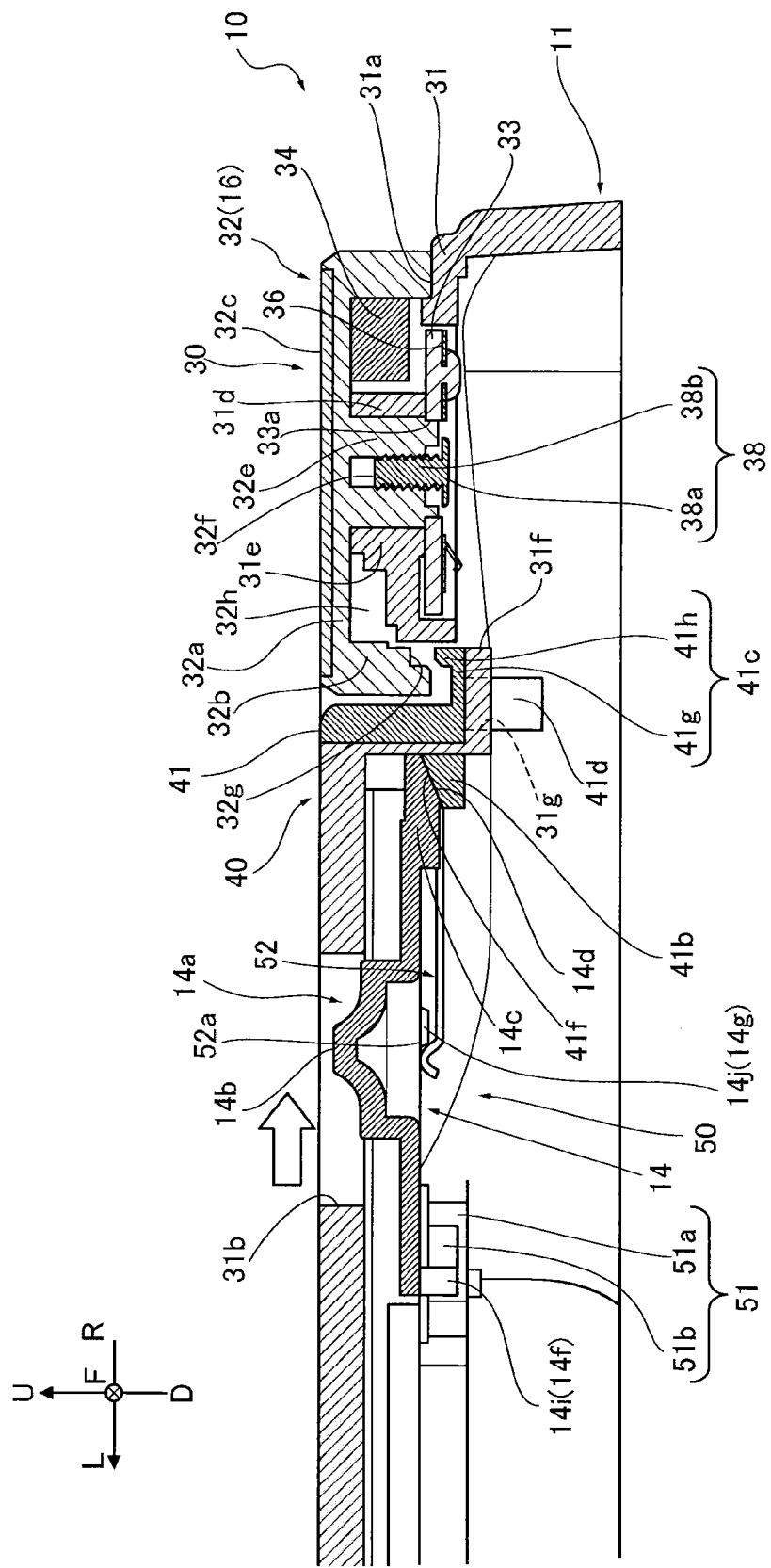
FIG. 15 illustrates the on/off lever 14 in the operating state (power-on) in the same manner as FIG. 7.

Furthermore, when the on/off lever 14 moves rightward from the non-operating position, i.e., approaches the locking member 41, the lever-side incline 14d of the on/off lever 14 is in touch with the lock-side incline 41f of the locking member 41 (see FIG. 14 to FIG. 16). Here, the on/off lever 14 is forced upward while the lock-side incline 41f is forced downward by a guiding function of the lever-side incline 14d and the lock-side incline 41f in contact with each other at their flat surface. Now, the on/off lever 14 is provided on the exterior covering 31 movably in the right-left direction, on the other hand, the locking member 41 is provided on the exterior covering 31 movably in the vertical direction and downwardly from the locking position. Therefore, when the on/off lever 14 moves rightward from the non-operating position, the locking member 41 is pressed downward by the locking elastic member 42 and moves downward from the locking position by the guiding function of the lever-side incline 14d and the lock-side incline 41f. Thus, the lever-side incline 14d and the lock-side incline 41f function as the cam mechanism part interfering with each other in order to change the force which moves the on/off lever 14 rightward from the non-operating position to the operating position into the force which moves the locking member 41 downward from the locking position to the releasing position.

Then, when the on/off lever 14 is in the operating position, as shown in FIG. 14 to FIG. 16, the locking member 41 is moved downward to the releasing position by the guiding function of the lever-side incline 14d and the lock-side incline 41f in contact with each other.

The on/off lever 14 is put into the non-operating position, and the operation of the control mechanism (main circuit) is stopped in the non-operating state (see FIG. 3, FIG. 7, and FIG. 8), by moving the lever piece 14b of the lever protrusion 14a of the on/off lever 14 leftward in the on/off lever aperture 31b of the exterior covering 31. At that time, the locking member 41 is in the locking position where the projected locking part 41h of the locking part 41c is inserted into the locking recess 32g of the rotating operation part 32 by the pressure of the locking elastic member 42 (see FIG. 7) since the lock-side incline 41f of the inclined member 41b is not in contact with the lever-side incline 14d of the hooking piece 14c of the on/off lever 14. Therefore, the rotation of the rotating operation part 32 of the rotating switch mechanism 30, i.e., the mode-switching dial 16 relative to the exterior covering 31 (the housing 11) is locked by the locking mechanism 40 where the locking member 41 is in the locking position.

Furthermore, in the imaging device 10, the on/off lever 14 is put into the operating position, and the control mechanism (main circuit) is started-up into the operating state by moving the lever piece 14b of the lever protrusion 14a of the on/off lever 14 rightward in the on/off lever aperture 31b of the exterior covering 31. At that time, the locking member 41 is moved downward with the rightward movement of the on/off lever 14 and put into the releasing position (see FIG. 14 to FIG. 16) by the guiding function by the lock-side incline 41f of the inclined member 41b and the lever-side incline 14d of the hooking piece 14c of the on/off lever 14 in contact with each other. Thus, the lock of the rotation of the rotating operation part 32 of the rotating switch mechanism 30, i.e., the mode-switching dial 16 relative to the exterior covering 31 (the housing 11) is released by the locking mechanism 40 where the locking member 41 is in the releasing position.

Furthermore, in the imaging device 10, even if the on/off lever 14 is in the non-operating position by moving the lever piece 14b (the lever protrusion 14a) leftward in the on/off lever aperture 31b, the locking member 41 in the locking position is put into the releasing position when the locking member 41 is pressed down against the pressure of the locking elastic member 42 in the locking operation recess 31c of the exterior covering 31. Because, when the on/off lever 14 is in the non-operating position, the lever-side incline 14d of the hooking piece 14c is kept from contact with the lock-side incline 41f of the inclined member 41b of the locking member 41 regardless of the movement of the locking member 41 between the locking position and the releasing position. Thereby, the locking of the rotation of the rotating operation part 32 of the rotating switch mechanism 30, i.e., the mode-switching dial 16 relative to the exterior covering 31 (the housing 11) by the locking mechanism 40 is released by putting the locking member 41 into the releasing position when the on/off lever 14 is in the non-operating position, and the rotation relative to the exterior covering 31 (the housing 11) is enabled. Thereby, in the locking mechanism 40, a pressing down operation of the locking member 41 in the locking position against the pressure of the locking elastic member 42 into the releasing position in the locking operation recess 31c of the exterior covering 31 is the releasing operation.

Because of such a configuration, in the imaging device 10 according to this embodiment, the rotation of the rotating operation part 32 (the mode-switching dial 16) can be locked by simply operating the switching member to put into the non-operating state since the rotation of the rotating operation part 32 (the mode-switching dial 16) of the rotating switch mechanism 30 relative to the exterior covering 31 (the housing 11) is locked by the locking mechanism 40, when the imaging device 10 is put into the non-operating state by the switching member (the on/off lever 14).

Moreover, unintentional rotation by the user of the rotating operation part 32 (the mode-switching dial 16) in the non-operating state can be prevented since the rotation of the rotating operation part 32 (the mode-switching dial 16) relative to the exterior covering 31 (the housing 11) is locked by the locking mechanism 40 when the imaging device 10 is in the non-operating state by the switching member (the on/off lever 14). Thus, the shooting mode can be prevented from being switched if the imaging device 10 is carried in a bag or a pocket.

Furthermore, the lock of the rotation of the rotating operation part 32 (the mode-switching dial 16) can be released by simply operating the switching member to put into the operating state since the lock of the rotation of the rotating operation part 32 (the mode-switching dial 16) of the rotating switch mechanism 30 relative to the exterior covering 31 (the housing 11) is released by the locking mechanism 40 when the imaging device 10 is put into the operating state by the switching member (the on/off lever 14).

The rotating operation part 32 (the mode-switching dial 16) relative to the exterior covering 31 (the housing 11) can be rotated without the releasing operation in the operating state since the lock of the rotating operation part 32 (the mode-switching dial 16) relative to the exterior covering 31 (the housing 11) is released by the locking mechanism 40 when the imaging device 10 is in the operating state by the switching member (the on/off lever 14). Thereby, the user can switch the shooting mode quickly and shoot in the intended shooting mode quickly in the operating state.

The rotation of the rotating operation part 32 (the mode-switching dial 16) can be locked by simply operating the shut-down (stop) operation to put the imaging device 10 into the non-operating state since the rotation of the rotating operation part 32 (the mode-switching dial 16) of the rotating switch mechanism 30 relative to the exterior covering 31 (the housing 11) is locked by the locking mechanism 40 when the switching member (the on/off lever 14) is put into the non-operating position.

The lock of the rotation of the rotating operation part 32 (the mode-switching dial 16) can be released by simply operating the start-up operation to put the imaging device 10 into the operating state (start-up) since the lock of the rotation of the rotating operation part 32 (the mode-switching dial 16) of the rotating switch mechanism 30 relative to the exterior covering 31 (the housing 11) is released by the locking mechanism 40 when the on/off lever 14 is moved to the operating position.

In the imaging device 10, lock and release of the rotation of the rotating operation part 32 (the mode-switching dial 16) in the locking mechanism 40 can be interlocked with the movement of the on/off lever 14 between the operating position and the non-operating position by a simpler configuration since the locking member 41 of the locking mechanism 40 is provided on the exterior covering 31 (the housing 11) movably between the locking position and the releasing position, the locking member 41 is put into the releasing position by interference between the on/off lever 14 in the operating position and the locking member 41, and the locking member 41 is put into the locking position by releasing the interference between the on/off lever 14 in the non-operating position and the locking member 41.

In the imaging device 10, the lock of the rotation of the rotating operation part 32 (the mode-switching dial 16) relative to the exterior covering 31 (the housing 11) by the locking mechanism 40 can be released without movement of the on/off lever 14 from the non-operating position by operating the releasing operation on the locking member 41 of the locking mechanism 40, even if the on/off lever 14 is in the non-operating position. Thus, the user can perform the rotating operation against the mode-switching dial 16 (the rotating operation part 32) and set the intended shooting mode even if the imaging device 10 is not started-up (non-operating state). Thereby, the user can set the shooting mode (preparation for the shooting) without starting-up, and can shoot as soon as starting-up the imaging device 10 in the intended shooting mode, and prevent shooting in the unintended shooting mode. Therefore, usability of the imaging device 10 can be improved.

In the imaging device 10, the locking member 41 is put into the releasing position by the interference between the on/off lever 14 in the operating position and the locking member 41 in the locking mechanism 40, and the locking member 41 is put into the locking position by releasing the interference between the on/off lever 14 in the non-operating position and the locking member 41. Thus, the lock of the rotation of the rotating operation part 32 (the mode-switching dial 16) by the locking mechanism 40 can be released without movement of the on/off lever 14 from the non-operating position by operating the releasing operation on the locking member 41, even if the on/off lever 14 is in the non-operating position by a simpler configuration. This is attributed to the fact that the lever-side incline 14d of the hooking piece 14c of the on/off lever 14 in the non-operating position does not contact with the lock-side incline 41f of the inclined member 41b of the locking member 41 regardless of the movement of the locking member 41 between the locking position and the releasing position.

In the locking mechanism 40 of the imaging device 10, the locking elastic member 42 presses the locking member 41 from the releasing position to the locking position, and the locking member 41 is put into the releasing position against the pressure of the locking elastic member 42 by interference between the on/off lever 14 in the operating position and the locking member 41 while the locking member 41 is put into the locking position by releasing the interference between the on/off lever 14 in the non-operating position and the locking member 41. Thus, the locking member 41 is returned to the locking position automatically by simply stopping the releasing operation on the locking member 41. Therefore, it is possible to maintain a state such that the lock of the rotation of the rotating operation part 32 (the mode-switching dial 16) by the locking mechanism 40 being released is prevented, and usability of the imaging device 10 can be improved.

In the imaging device 10, the moving direction between the locking position and the releasing position of the locking member 41 of the locking mechanism 40 relative to the exterior covering 31 (the housing 11) and the direction of the rotational axis Ar (rotational axis direction) of the rotating operation part 32 (the mode-switching dial 16) are parallel to the vertical direction. Thus, the direction of the releasing operation on the locking member 41 and the direction of the rotating operation on the rotating operation part 32 (the mode-switching dial 16) are perpendicular to each other. Therefore, the external force putting the locking member 41 into the releasing position and the external force rotating the rotating operation part 32 (the mode-switching dial 16) can be further prevented from accidentally working at the same time. Thus, the rotation of the rotating operation part 32 (the mode-switching dial 16) accidentally is prevented in the non-operating state more effectively.

In the imaging device 10, the lock and release of the rotation of the rotating operation part 32 (the mode-switching dial 16) in the locking mechanism 40 are interlocked with the movement of the on/off lever 14 between the operating position and the non-operating position by a simpler configuration, since the cam mechanism part provided between the on/off lever 14 and the locking member 41 converts the force moving the on/off lever 14 from the non-operating position toward the operating position into the force moving the locking member 41 from the locking position toward the releasing position.

In the imaging device 10, the force moving the on/off lever 14 from the non-operating position toward the operating position can be converted into the force moving the locking member 41 from the locking position toward the releasing position by a simpler configuration since the cam mechanism part is composed of the lever-side incline 14d of the hooking piece 14c of the on/off lever 14 and the lock-side incline 41f of the inclined member 41b of the locking member 41.

In the imaging device 10, the on/off lever 14 is prevented from being moved from the operating position to the non-operating position through the cam mechanism part (the lever-side incline 14d and the lock-side incline 41f) by the pressure of the locking elastic member 42 of the locking mechanism 40 since the holding mechanism part holds the on/off lever 14 at the operating position.

In the imaging device 10, the on/off lever 14 is prevented from being moved from the operating position to the non-operating position by the pressure of the locking elastic member 42 of the locking mechanism 40 without disturbing the start-up operation and the shut-down operation on the on/off lever 14 since the holding mechanism part is configured to allow the movement of the on/off lever 14 between the non-operating position and the operating position while holding the on/off lever 14 at the operating position.

In the imaging device 10, the on/off lever 14 is prevented from being moved from the operating position to the non-operating position by the pressure of the locking elastic member 42 of the locking mechanism 40, and an amount of force required to operate the on/off lever 14 can be varied when the on/off lever 14 moves between the non-operating position and the operating position without disturbing the start-up operation and the shut-down operation on the on/off lever 14, since the holding mechanism part is configured to allow the movement of the on/off lever 14 between the operating position and the non-operating position while holding the on/off lever 14 at the non-operating position and the operating position. Thereby, a response (clicking feel) that the on/off lever 14 is in the operating position or in the non-operating position can be produced in addition to the on/off lever 14 being held at the operating position.

In the imaging device 10, the user can understand that the on/off lever 14 is in the non-operating position or the operating position by the response, thus the operation can be made easier.

In the imaging device 10, the movement of the on/off lever 14 from the operating position to the non-operating position by the pressure of the locking elastic member 42 of the locking mechanism 40 can be prevented by a simpler configuration, since the holding mechanism part is formed of the holding elastic member 52 which is the plate spring member.

In the imaging device 10, the movement of the on/off lever 14 from the operating position to the non-operating position by the pressure of the locking elastic member 42 of the locking mechanism 40 can be prevented by a simpler configuration, since the on/off lever 14 is held at the operating position by pressing the holding projection portion 52a of the holding elastic member 52 which is a plate spring member on the retaining piece 14g at the left side of the holding projection portion 14j of the on/off lever 14.

In the imaging device 10, the movement of the on/off lever 14 from the operating position to the non-operating position by the pressure of the locking elastic member 42 of the locking mechanism 40 can be prevented without disturbing the movement of the on/off lever 14 between the operating position and the non-operating position by a simpler configuration, since the on/off lever 14 is held at the operating position by pressing the holding projection portion 52a of the holding elastic member 52 which is a plate spring member on the retaining piece 14g at the left side of the holding projection portion 14j of the on/off lever 14, and the on/off lever 14 is held at the non-operating position by pressing the holding projection portion 52a on the retaining piece 14g at the right side of the holding projection portion 14j of the on/off lever 14.

In the imaging device 10, the movement of the on/off lever 14 from the operating position to the non-operating position by the pressure of the locking elastic member 42 of the locking mechanism 40 can be prevented and the response (clicking feel) that the on/off lever 14 is in the operating position or in the non-operating position can be produced without disturbing the start-up operation and the shut-down operation on the on/off lever 14 by a simpler configuration, since the on/off lever 14 is held at the operating position by pressing the holding projection portion 52a of the holding elastic member 52 which is a plate spring member on the retaining piece 14g at the left side of the holding projection portion 14j of the on/off lever 14 and the on/off lever 14 is held at the non-operating position by pressing the holding projection portion 52a on the retaining piece 14g at of the right side of the holding projection portion 14j of the on/off lever 14.

The on/off lever 14 can be held at the operating position, the response (clicking feel) that the on/off lever 14 is in the non-operating position or the operating position can be produced, and the imaging device 10 can be downsized without disturbing the start-up operation and the shut-down operation on the on/off lever 14, since the holding elastic member 52 which is a plate spring member is provided in parallel to the horizontal direction.

In the imaging device 10, it is difficult for the locking member 41 which is in the releasing position to move upward into the locking position by putting the on/off lever 14 into the operating position since the locking member 41 is provided on the exterior covering 31 (the locking operation recess 31c thereof) movably in a vertical direction and in the predefined range, and the lower limit of the predefined range is the same as the releasing position of the locking member 41. Thus, the on/off lever 14 and the imaging device 10 can be prevented from being put into the non-operating state (control mechanism (main circuit) is stopped) by incorrect operation of the locking member 41.

In the imaging device 10, the locking member 41 is of a size such that its upper surface becomes flush with surrounding members (an upper surface of the rotating operation part 32 (surface of the marked part 32c) and a periphery of the locking operation recess 31c of the exterior covering 31) when the locking member 41 is in the releasing position. Therefore, it is difficult for the locking member 41 which is in the releasing position to move upward into the locking position by putting the on/off lever 14 into the operating position, the on/off lever 14 into the non-operating position, and the imaging device 10 into the non-operating state (control mechanism (main circuit) is stopped) by incorrect operation of the locking member 41.

Therefore, in the imaging device 10 as the electronic device according to the present invention, the rotation of the rotating operation part 32 of the rotating switch mechanism 30 can be locked with improved usability.

Note that, in the embodiment above, an electronic device according to the present invention is described. However, it is not limited to the embodiment above as long as it is an electronic device comprising a rotating switch mechanism for switching a conduction state of a predefined electronic circuit corresponding to a rotating operation of a rotating operation part rotatably provided on a housing on the predefined rotational axis, a locking mechanism for locking the rotation of the rotating operation part relative to the housing, and a switching member for switching an operating state and a non-operating state of the electronic device, wherein the locking mechanism locks the rotation of the rotating operation part relative to the housing when the electronic device is in the non-operating state and does not lock the rotation of the rotating operation part relative to the housing when the electronic device is in the operating state.

Furthermore, in the above the embodiment, the locking member 41 is put into the releasing position by the interference between the on/off lever 14 in the operating position and the locking member 41 in the locking mechanism 40, and the locking member 41 is put into the locking position by releasing the interference between the on/off lever 14 in the non-operating position and the locking member 41. However, the present invention is not limited to the embodiment above as long as the lock and the release operation of the rotation of the rotating operation part 32 (the mode-switching dial 16) are interlocked with the switching operation of the switching member (the on/off lever 14 in the embodiment above) between the operating state and the non-operating state.

Furthermore, in the embodiment described above, the locking member 41 is put into the locking position by the pressure of the locking elastic member 42 by releasing the interference between the on/off lever 14 in the operating position and the locking member 41. However, it is not limited to the embodiment above as long the lock and the release operation of the rotation of the rotating operation part 32 (the mode-switching dial 16) are interlocked with the switching operation of the switching member (the on/off lever 14 in the embodiment above) between the operating state and the non-operating state, and the lock of the rotation of the rotating operation part can be released by releasing operation without the movement of the on/off lever 14 from the non-operating position.

In the embodiment above, although the locking elastic member 42 is used as an elastic member of the locking mechanism 40, the elastic member is not limited to the embodiment above as long as it presses the locking member 41 from the releasing position to the locking position.

In the embodiment above, although the rotation of the rotating operation part 32 in the predefined rotational position relative to the housing 11 (the exterior covering 31) is locked, it is not be limited to the embodiment above as long as the rotation of the rotating operation part 32 of the locking mechanism 40 is relative to the housing 11 (the exterior covering 31).

In the embodiment above, the cam mechanism part is composed of the lock-side incline 41*f* of the inclined member 41*b* of the locking member 41 and the lever-side incline 14*d* of the hooking piece 14*c* of the on/off lever 14. However, it is not limited to the embodiment above as long as it can convert the force moving the on/off lever 14 from the non-operating position toward the operating position to the force moving the locking member 41 from the locking position toward the releasing position.

In the embodiment above, the rotating switch mechanism 30 is formed of the mode-switching dial 16. However, it is not limited to the embodiment above as long as it switches the conduction state of a predefined electric circuit depending on the rotating operation of the rotating operation part 32 rotatably provided on the housing (the housing 11) on the rotational axis Ar.

In the embodiment above, the holding mechanism part is composed of the holding elastic member 52, the retaining piece 14*g* and the holding projection portion 14*j* of the on/off lever 14. However, it is not limited to the embodiment above as long is it allows the movement of the on/off lever 14 between the operating position and the non-operating position and holds the on/off lever 14 at the operating position.

In the embodiment above, the imaging device 10 is described as an example of the electronic device. However, it is not limited to the embodiment above and can be a variety of electronic devices as mobile terminal devices such as a so-called PDA (personal data assistant) and a mobile phone, or electronic devices as image input devices as long as it has the rotating switch mechanism (the rotating switch mechanism 30) switching the conduction state of a predefined electric circuit depending on the rotating operation of the rotating operation part 32 rotatably provided on the housing (the housing 11) on the rotational axis Ar.

Hereinabove, the electronic device and the rotating switch mechanism of the present invention have been described with reference to the embodiment. However, the specific configuration is not limited to the above embodiment, and includes design changes and additions without departing from the scope of the invention. Furthermore, the number of members, position, or shape is not limited to the embodiment and can be configured accordingly.

What is claimed is:

1. An electronic device, comprising:
a rotating switch mechanism for switching a conduction state of a predefined electronic circuit corresponding to a rotating operation of a rotating operation part rotatably provided on a housing on a predefined rotational axis;
a locking mechanism for locking the rotation of the rotating operation part relative to the housing; and
a switching member for switching an operating state and a non-operating state of the electronic device; wherein
the locking mechanism locks the rotation of the rotating operation part relative to the housing when the electronic device is in the non-operating state and does not lock the rotation of the rotating operation part relative to the housing when the electronic device is in the operating state,
the switching member is movable between the operating position for putting the electronic device into the operating state and the non-operating position for putting the electronic device into the non-operating state, and
the switching member releases the lock of the rotation of the rotating operation part relative to the housing by interference with the locking mechanism when the switching member is in the operating position, and the switching member locks the rotation of the rotating operation part relative to the housing by being released from interference with the locking mechanism when the switching member is in the non-operating position.

2. The electronic device according to claim 1, wherein the locking mechanism can perform a releasing operation of the lock of the rotation of the rotating operation part relative to the housing even if the switching member is in the non-operating position, and can release the lock of the rotation of the rotating operation part relative to the housing without movement of the switching member from the non-operating position when the releasing operation is performed.

3. The electronic device according to claim 2, wherein
the locking mechanism has a locking member which is movable between the locking position to lock the rotation of the rotating operation part relative to the housing and the releasing position not to lock the rotation of the rotating operation part relative to the housing,
the locking member is moved from the locking position to the releasing position as the releasing operation in the locking mechanism, and
the switching member does not interfere with the locking member moving between the locking position and the releasing position when the switching member is in the non-operating position.

4. The electronic device according to claim 3, wherein
the locking mechanism has an elastic member pressing the locking member from the releasing position to the locking position, and
the locking member is moved from the locking position to the releasing position by interference of the switching member against the pressure from the elastic member when the switching member is moved from the non-operating position to the operating position, and moved to the locking position by pressure from the elastic member by releasing from the interference with the switching member when the switching member is put into the non-operating position.

5. The electronic device according to claim 3, wherein the moving direction of the locking member between the locking position and the releasing position is in parallel with the direction of the rotational axis of the rotating operation part in the locking mechanism.

6. The electronic device according to claim 3, wherein the locking mechanism has a cam mechanism part to convert a force to move the switching member from the non-operating position to the operating position to a force to move the locking member from the locking position to the releasing position between the locking member and the switching member.

7. The electronic device according to claim 1, further comprising a holding mechanism part for holding the switching member in the operating position while allowing the movement of the switching member between the non-operating position and the operating position.

8. The electronic device according to claim 7, wherein the holding mechanism part has a plate spring member capable of being touched by the switching member in the moving direction between the non-operating position and the operating position while capable of curvature deformation in a direction perpendicular to the moving direction.

9. A rotating switch mechanism provided to an electronic device in order to switch conduction states of a predefined electronic circuit according to a rotating operation of a rotating operation part rotatably provided on a housing around a predefined rotational axis, comprising
    a locking mechanism locking the rotation of the rotating operation part relative to the housing, wherein
    the switching member is movable between the operating position for putting the electronic device into the operating state and the non-operating position for putting the electronic device into the non-operating state, and
    the switching member releases the lock of the rotation of the rotating operation part relative to the housing by interference with the locking mechanism when the switching member is in the operating position, and the switching member locks the rotation of the rotating operation part relative to the housing by being released from interference with the locking mechanism when the switching member is in the non-operating position.

10. An electronic device, comprising:
    a rotating switch mechanism for switching a conduction state of a predefined electronic circuit corresponding to a rotating operation of a rotating operation part rotatably provided on a housing on a predefined rotational axis;
    a locking mechanism for locking the rotation of the rotating operation part relative to the housing; and
    a switching member for switching an operating state and a non-operating state of the electronic device; wherein
    the operating state and the non-operating state are switchable by the switching member, and the locking mechanism locks the rotation of the rotating operation part relative to the housing when the electronic device is put into the non-operating state by the switching member and does not lock the rotation of the rotating operation part relative to the housing when the electronic device is put into the operating state by the switching member,
    the switching member is movable between the operating position for putting the electronic device into the operating state and the non-operating position for putting the electronic device into the non-operating state, and
    the switching member releases the lock of the rotation of the rotating operation part relative to the housing by interference with the locking mechanism when the switching member is in the operating position, and the switching member locks the rotation of the rotating operation part relative to the housing by being released from interference with the locking mechanism when the switching member is in the non-operating position.

\* \* \* \* \*